US012499817B2

(12) United States Patent
Park et al.

(10) Patent No.: US 12,499,817 B2
(45) Date of Patent: Dec. 16, 2025

(54) LIGHT EMITTING DISPLAY DEVICE

(71) Applicant: Samsung Display Co., LTD., Yongin-si (KR)

(72) Inventors: Jun Hyun Park, Yongin-si (KR); Jang Mi Kang, Yongin-si (KR); Hyeong Seok Kim, Yongin-si (KR); Min Jae Jeong, Yongin-si (KR); Mu Kyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 48 days.

(21) Appl. No.: 18/348,863

(22) Filed: Jul. 7, 2023

(65) Prior Publication Data

US 2024/0062710 A1 Feb. 22, 2024

(30) Foreign Application Priority Data

Aug. 22, 2022 (KR) ........................ 10-2022-0104755

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0852* (2013.01); *G09G 2310/08* (2013.01); *G09G 2320/0252* (2013.01); *G09G 2320/045* (2013.01); *G09G 2330/027* (2013.01)

(58) Field of Classification Search
CPC ... G09G 3/32–3291; G09G 2300/0426; G09G 2300/0819; G09G 2300/0852; G09G 2310/08; G09G 2320/0252; G09G 2320/045; G09G 2330/027; G09G 3/035; G09G 2300/0861; G09G 2310/0251; G09G 2310/0256; G09G 3/3233; G09G 2300/043; G09G 2300/0842
See application file for complete search history.

(56) References Cited

U.S. PATENT DOCUMENTS

| | | | | |
|---|---|---|---|---|
| 9,576,527 | B2 * | 2/2017 | Han | G09G 3/003 |
| 11,049,458 | B1 * | 6/2021 | Fan | G09G 3/3266 |
| 11,804,171 | B2 | 10/2023 | Park et al. | |

(Continued)

FOREIGN PATENT DOCUMENTS

| | | | |
|---|---|---|---|
| KR | 10-2017-0000662 | A | 1/2017 |
| KR | 10-1726627 | B1 | 4/2017 |

(Continued)

*Primary Examiner* — Roberto W Flores
(74) *Attorney, Agent, or Firm* — Womble Bond Dickinson (US) LLP

(57) ABSTRACT

A light emitting display device includes: a light emitting diode; a driving transistor configured to transmit an output current to the light emitting diode, and including a driving gate electrode; a storage capacitor having a first storage electrode connected with the driving gate electrode and a second storage electrode connected with a data node; a second transistor connected with a data line and configured to output a data voltage; a data voltage transmission transistor configured to transmit the data voltage output from the second transistor to the data node; and a hold capacitor that includes a first electrode configured to receive the driving voltage and a second electrode connected with the data node.

11 Claims, 29 Drawing Sheets

(56) References Cited

U.S. PATENT DOCUMENTS

| | | | | |
|---|---|---|---|---|
| 2011/0090202 | A1* | 4/2011 | Han | G09G 3/3233 345/76 |
| 2015/0029239 | A1* | 1/2015 | Park | G09G 3/3241 345/691 |
| 2015/0108437 | A1* | 4/2015 | Cho | G09G 3/3233 257/40 |
| 2015/0130691 | A1* | 5/2015 | Jeon | G09G 3/3225 345/82 |
| 2019/0279567 | A1* | 9/2019 | Hwang | G09G 3/3291 |
| 2020/0202766 | A1* | 6/2020 | Lee | G09G 1/165 |
| 2021/0248961 | A1* | 8/2021 | Yang | G09G 3/3233 |
| 2023/0120765 | A1* | 4/2023 | Wang | G09G 3/3233 345/212 |
| 2024/0013712 | A1 | 1/2024 | Park et al. | |

FOREIGN PATENT DOCUMENTS

| | | | |
|---|---|---|---|
| KR | 10-2019-0069208 | A | 6/2019 |
| KR | 10-2020-0069148 | A | 6/2020 |
| KR | 10-2023-0044091 | A | 4/2023 |

* cited by examiner

LIGHT EMITTING DISPLAY DEVICE

CROSS-REFERENCE TO RELATED APPLICATION

The present application claims priority to and the benefit of Korean Patent Application No. 10-2022-0104755 filed in the Korean Intellectual Property Office on Aug. 22, 2022, the entire contents of which are incorporated herein by reference.

BACKGROUND

1. Field

Aspects of some embodiments of the present disclosure relate to a light emitting display device.

2. Description of the Related Art

As a display for displaying images, a display device includes a liquid crystal display (LCD), an organic light emitting diode (OLED) display, and the like. Display devices may be used in various electronic devices such as a portable phone, a navigation device, a digital camera, an electronic book, a portable game device, or various terminals.

A light emitting display device such as an organic light emitting device may have a structure in which the display device can be bent or folded by using a flexible substrate.

The above information disclosed in this Background section is only for enhancement of understanding of the background and therefore the information discussed in this Background section does not necessarily constitute prior art.

SUMMARY

Aspects of some embodiments of the present disclosure relate to a light emitting display device, and more particularly, it relates to a light emitting display device that includes a transistor including a polycrystalline semiconductor and a transistor including an oxide semiconductor.

Some embodiments may prevent or reduce deterioration of the display quality by controlling the charge amount charged to a storage capacitor in a pixel at high-speed driving by adjusting the characteristics of the transistor transmitting a data voltage.

Some embodiments may separate an operation of writing a data voltage and an operation of compensating for a threshold voltage of a driving transistor to enable relatively high-speed driving.

Some embodiments may form a pixel that includes a transistor including an oxide semiconductor and a transistor including a polycrystalline semiconductor, and form the pixel to be highly connected by separating a layer on which the oxide semiconductor is formed and a layer on which the polycrystalline semiconductor is formed.

A light emitting display device according to some embodiments includes: a light emitting diode; a driving transistor that transmits an output current to the light emitting diode, and includes a driving gate electrode; a storage capacitor that includes a first storage electrode connected with the driving gate electrode and a second storage electrode connected with a data node; a second transistor that is connected with a data line and outputs a data voltage; a data voltage transmission transistor that transmits the data voltage output from the second transistor to the data node; and a hold capacitor that includes a first electrode receiving the driving voltage and a second electrode connected with the data node.

According to some embodiments, the second transistor, the data voltage transmission transistor, and the storage capacitor may form a data voltage transmission path for transmission of the data voltage to the driving gate electrode of the driving transistor, and the second transistor and the data voltage transmission transistor may be different types of transistors.

According to some embodiments, the driving transistor and the second transistor may be polycrystalline transistors and are turned on by a low-level voltage and turned off by a high-level voltage, and the data voltage transmission transistor may be an oxide transistor and is turned on by a high-level voltage and turned off by a low-level voltage.

According to some embodiments, the data voltage transmission transistor may include a gate electrode, an oxide semiconductor, and a first auxiliary electrode that overlaps the oxide semiconductor, and the first auxiliary electrode may be connected to the gate electrode of the second compensation transistor, applied with a voltage of a constant level, or applied with a voltage of which a voltage level is changed.

According to some embodiments, the gate electrode of the data voltage transmission transistor may be connected with a scan line for an oxide transistor of the present stage, and the first auxiliary electrode may be electrically connected with a scan line for the oxide transistor at a stage different from the scan line for the oxide transistor at the present stage or the next stage.

According to some embodiments, the light emitting display device may further include: a first compensation transistor including a first electrode connected with the second electrode of the driving transistor; and a second compensation transistor that includes a second electrode connected with the driving gate electrode and the first storage electrode, wherein the first electrode of the driving transistor may receive the driving voltage, and the second electrode of the first compensation transistor and the first electrode of the second compensation transistor may be connected with each other.

According to some embodiments, the first compensation transistor may be a polycrystalline transistor, and may be turned on by a low-level voltage and turned off by a high-level voltage, and the second compensation transistor may be an oxide transistor, and may be turned on by a high-level voltage and turned off by a low-level voltage.

According to some embodiments, the second compensation transistor may include a gate electrode, an oxide semiconductor, and a second auxiliary electrode overlapping the oxide semiconductor, and the second auxiliary electrode may be connected with the gate electrode of the second compensation transistor, applied with a constant level voltage, or applied with a voltage of which a voltage level is changed.

According to some embodiments, the light emitting display device may further include: a first initialization transistor including a gate electrode, a first electrode receiving a first initialization voltage, and a second electrode connected with the second electrode of the first compensation transistor and the first electrode of the second compensation transistor; and an anode initialization transistor including a gate electrode, a first electrode receiving a second initialization voltage, and a second electrode connected with an anode of the light emitting diode.

According to some embodiments, the light emitting display device may further include a data node initialization transistor that transmits a reference voltage or a driving voltage to the second electrode of the second transistor and the first electrode of the data voltage transmission transistor, wherein the second electrode of the second transistor and the first electrode of the data voltage transmission transistor may be connected with each other, and the reference voltage or the driving voltage transmitted from the data node initialization transistor may be transmitted to the data node through the data voltage transmission transistor.

According to some embodiments, the light emitting display device may further include: a driving voltage transmission transistor including a gate electrode, a first electrode receiving the driving voltage, and a second electrode connected with the first electrode of the driving transistor; and a current transmission transistor including a gate electrode, a first electrode connected with the second electrode of the driving transistor, and a second electrode connected with the anode of the light emitting diode.

According to some embodiments, the light emitting display device may further include a bias transistor that includes a gate electrode, a first electrode receiving a bias voltage, and a second electrode connected with the first electrode of the driving transistor.

A light emitting display device according to some embodiments includes: a light emitting diode; a driving transistor that transmits an output current to the light emitting diode, and includes a driving gate electrode; a storage capacitor that includes a first storage electrode connected with the driving gate electrode and a second storage electrode connected with a data node; a second transistor that is connected with a data line and transmits a data voltage to the data node; and a hold capacitor that includes a first electrode receiving a driving voltage and a second electrode connected with the data node, wherein the second transistor is an oxide transistor and the driving transistor is a polycrystalline transistor.

According to some embodiments, the second transistor may include a gate electrode, an oxide semiconductor, and a third auxiliary electrode overlapping the oxide semiconductor, and the third auxiliary electrode may be connected with the gate electrode of the second transistor, applied with a constant-level voltage, or applied with a voltage of which a voltage level is changed.

According to some embodiments, the light emitting display device may further include: a first compensation transistor that includes a gate electrode, a first electrode connected with the second electrode of the driving transistor, and a second electrode connected with the driving gate electrode of the driving transistor; a first initialization transistor that includes a gate electrode, a first electrode receiving a first initialization voltage, and a second electrode connected with the driving gate electrode; and a data node initialization transistor including a gate electrode, a first electrode receiving a reference voltage or the driving voltage, and a second electrode connected with the second electrode of the second transistor, wherein at least one of the first compensation transistor, the first initialization transistor, or the data node initialization transistor may further include an auxiliary electrode, and the auxiliary electrode may be connected with a gate electrode of an overlapping transistor, applied with a constant-level voltage, or applied with a voltage of which a voltage level is changed.

According to some embodiments, the first compensation transistor may further include an oxide semiconductor and a fourth auxiliary electrode overlapping the oxide semiconductor, and the fourth auxiliary electrode may be connected with the gate electrode of the second compensation transistor, applied with a constant-level voltage, or applied with a voltage of which a voltage level is changed.

According to some embodiments, the light emitting display device may further include: a driving voltage transmission transistor that includes gate electrode, a first electrode receiving the driving voltage, and a second electrode connected with a first electrode of the driving transistor; a current transmission transistor that includes a gate electrode, a first electrode connected with a second electrode of the driving transistor, and a second electrode connected with an anode of the light emitting diode; a bias transistor that includes a gate electrode, a first electrode receiving a bias voltage, and a second electrode connected with the first electrode of the driving transistor; and an anode initialization transistor including a gate electrode, a first electrode receiving a second initialization voltage, and a second electrode connected with the anode of the light emitting diode.

According to some embodiments, a light emitting display device according to some embodiments includes: a substrate; a first semiconductor layer positioned on the substrate; a driving gate electrode positioned on the first semiconductor layer, and overlapping at least a part of the first semiconductor layer on a plane; a second storage electrode positioned on the driving gate electrode, and overlapping the driving gate electrode; and a first hold electrode positioned on the second storage electrode, and overlapping the second storage electrode, wherein the driving gate electrode and the second storage electrode form a storage capacitor by overlapping one a plane, and the second storage electrode and the first hold electrode form a hold capacitor by overlapping on a plane.

According to some embodiments, the first hold electrode may include a first opening and a second opening, the second storage electrode may include an opening, the driving gate electrode, the first opening of the first hold electrode, and the opening of the second storage electrode may overlap on a plane, and the second opening of the first hold electrode may overlap the second storage electrode on a plane.

According to some embodiments, the light emitting display device may further include: an oxide semiconductor layer positioned on the first hold electrode; and a gate electrode of an oxide semiconductor that is positioned on the oxide semiconductor layer, and overlaps at least a part of the oxide semiconductor layer on a plane, wherein the oxide semiconductor layer may include a first oxide semiconductor and a second oxide semiconductor, the first oxide semiconductor may be connected with the second storage electrode through the second opening of the first hold electrode, and the second oxide semiconductor may be connected with the driving gate electrode through the first opening of the first hold electrode and the opening of the second storage electrode.

According to some embodiments, at least one of the transistors that transmits a data voltage to a driving transistor formed of a polycrystalline semiconductor is formed of a transistor including an oxide semiconductor, and the data voltage can be transmitted to the gate electrode of the driving transistor in a short time by changing the threshold voltage of the transistor including the oxide semiconductor such that a sufficient amount of charge can be assured even during high-speed operation, while preventing or reducing deterioration of display quality.

According to some embodiments, an operation in which the data voltage is transmitted through a capacitor instead of being directly transmitted to the gate electrode of the driving transistor to be written and an operation to compensate for the threshold voltage of the driving transistor may be separated, and high-speed driving may be enabled.

According to some embodiments, both the transistor including an oxide semiconductor and the transistor including a polycrystalline semiconductor are included, and a pixel is formed by separating a layer on which the oxide semiconductor is formed and a layer on which the polycrystalline semiconductor is formed, and accordingly, a pixel of which a plurality of layers are overlapped and highly connected can be formed.

DETAILED DESCRIPTION

Figure 1:
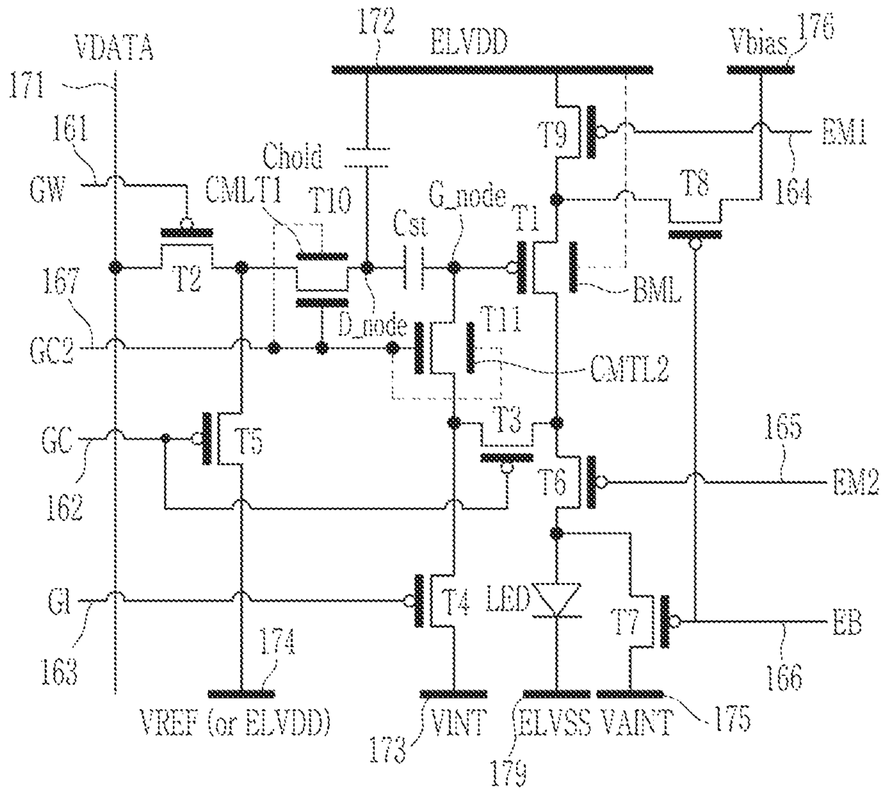
FIG. 1 is an equivalent circuit diagram of a pixel included in a light emitting display device according to some embodiments.

Hereinafter, aspects of some embodiments of the present invention will be described in more detail with reference to the accompanying drawing, and thus a person of an ordinary skill can easily perform it in the technical field to which the present invention belongs. The present invention may be implemented in several different forms and is not limited to the embodiments described herein.

In order to more clearly explain aspects of embodiments of the present invention, some description of some components that is not necessary to enable a person having ordinary skill in the art to make and use the invention may be omitted, and the same reference sign is designated to the same or similar constituent elements throughout the specification.

In addition, because the size and thickness of each component shown in the drawing are arbitrarily indicated for better understanding and ease of description, the present invention is not necessarily limited to the drawings. In the drawings, the thickness of layers, films, panels, regions, etc., are exaggerated for clarity. In addition, in the drawings, the thicknesses of some layers and regions are exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

In addition, when "connected to" in the entire specification, this does not only mean that two or more constituent elements are directly connected, but also means that two or more constituent elements are indirectly connected, physically connected, and electrically connected through other constituent elements, or being referred to by different names depending on the position or function, while being integral.

In addition, in the entire specification, when parts such as wiring, layer, film, region, plate, and constituent elements are "extended in a first direction or second direction," this does not mean only a straight line shape extending in the corresponding direction but also means a structure that is generally extended along the first direction or second direction, including a structure that is bent in one part, a zigzag structure, or structure extended while having a curved line structure.

In addition, electronic devices (for example, mobile phones, TVs, monitors, laptop computers, etc.) including display devices and display panels described in the specification or electronic devices including the display devices and the display panels manufactured by the manufacturing method described in the specification are not excluded from the scope of rights of this specification.

Hereinafter, a circuit structure of one pixel in a light emitting display device according to some embodiments will be described in more detail with reference to FIG. 1.

FIG. 1 is an equivalent circuit diagram of a pixel included in a light emitting display device according to some embodiments.

Referring to FIG. 1, one pixel includes a light emitting diode LED and a pixel circuit portion that drives the light emitting diode LED, and the pixel circuit portions are arranged in a matrix format. In FIG. 1, the pixel circuit portion include all other elements, except for the light emitting diode, and the pixel circuit portion of the pixel according to some embodiments as illustrated in FIG. 1 includes a driving transistor T1, a second transistor T2, third transistor T3, a fourth transistor T4, a fifth transistor T5, a sixth transistor T6, a seventh transistor T7, an eighth transistor T8, a ninth transistor T9, a tenth transistor T10, an eleventh transistor T11, a storage capacitor Cst, and a hold capacitor Chold. In addition, the pixel circuit portion may be connected with a first scan line 161 to which a first scan signal GW, a second scan line 162 to which a second scan signal GC is applied, a 2-1 scan line 167 to which a 2-1 scan signal GC2 corresponding to the second scan signal GC is applied, a third scan line 163 to which a third scan signal GI is applied, light emitting signal lines 164 and 165 to which light emitting signals EM1 and EM2 are applied, a fourth scan line 166 to which a fourth scan signal EB is applied, and a data line 171 to which a data voltage VDATA is applied. In addition, the pixel may be applied with a driving voltage ELVDD (hereinafter also referred to as a first driving voltage), a driving low voltage ELVSS (hereinafter also referred to as a second driving voltage), a first initialization voltage VINT, a second initialization voltage VAINT, a reference voltage VREF, and a bias voltage Vbias.

The structure of the pixel will be described, focusing on each element (transistor, capacitor, light emitting diode) included in the pixel.

The driving transistor T1 includes a gate electrode (hereinafter, also referred to as a driving gate electrode) connected with a first electrode of the storage capacitor Cst, a first electrode (input side electrode) connected to the driving voltage ELVDD through the ninth transistor T9, and a second electrode (output side electrode) outputting a current according to a voltage of the driving gate electrode.

The gate electrode of the driving transistor T1 (hereinafter referred to as a first transistor) is connected to a second electrode (output side electrode) of the eleventh transistor T11 and the first electrode of the storage capacitor Cst. The first electrode of the driving transistor T1 is connected with a second electrode (output side electrode) of the ninth transistor T9 and a second electrode (output side electrode) of the eighth transistor T8 and thus receives the driving voltage ELVDD and/or the bias voltage Vbias, and the second electrode of the driving transistor T1 is connected with a first electrode (input side electrode) of the third transistor T3 and a first electrode (input side electrode) of the sixth transistor T6.

An output current of the driving transistor T1 is transmitted to the light emitting diode LED through the sixth transistor T6 such that the light emitting diode LED emits light. Depending on the intensity of the output current of the driving transistor T1, the luminance of the light emitted by the light emitting diode LED is determined. Meanwhile, the driving transistor T1 may further include an overlapping electrode BML that overlaps at least a part (e.g., a channel) of a semiconductor (e.g., a polycrystalline semiconductor) of the driving transistor. In FIG. 1, it is illustrated that the overlapping electrode BML is connected with the driving voltage line 172 and thus applied with the driving voltage ELVDD using the dotted line, but this indicates that the overlapping electrode BML may be connected with other portions (e.g., the first electrode, the second electrode, or other voltage lines of the driving transistor T1) rather than being connected with the driving voltage line 172.

The second transistor T2 (hereinafter, also referred to as a data input transistor) includes a gate electrode connected with the first scan line 161 to which the first scan signal GW is applied, a first electrode (input side electrode) connected with the data line 171 to which the data voltage VDATA is applied, and a second electrode (output side electrode) connected with a second electrode of the fifth transistor T5 and a first electrode of the tenth transistor T10. The second transistor T2 inputs the data voltage VDATA into the pixel according to the first scan signal GW such that the data voltage VDATA can be stored in the second electrode of the storage capacitor Cst through the tenth transistor T10.

The third transistor T3 (hereinafter also referred to as a first compensation transistor) includes a gate electrode connected with the second scan line 162 to which the second scan signal GC is applied, a first electrode (input side electrode) connected with the second electrode of the driving transistor T1 and a first electrode of the sixth transistor T6, and a second electrode (output side electrode) connected with a first electrode of the eleventh transistor T11 and a second electrode of the fourth transistor T4. The third transistor T3 forms a compensation path that compensates for the threshold voltage of the driving voltage T1 together with the eleventh transistor T11 (hereinafter also referred to as a second compensation transistor) such that the threshold voltage of the driving transistor T1 is stored in the first electrode of the storage capacitor Cst for compensation. As a result, although the threshold voltage of the driving transistor T1 included in each pixel is different, the driving transistor T1 may output a constant output current according to the applied data voltage VDATA.

The fourth transistor T4 (hereinafter also referred to as a first initialization transistor) includes a gate electrode connected to the third scan line 163 to which the third scan signal GI is applied, a first electrode receiving the first initialization voltage VINT, and a second electrode connected with the second electrode of the third transistor T3 and the first electrode of the eleventh transistor T11. The fourth transistor T4 serves to initialize the second electrode of the third transistor T3 and the second electrode of the eleventh transistor T11 by transmitting the first initialization voltage VINT into the pixel, respectively, and when the eleventh transistor T11 is turned on in the following period, the gate electrode of the driving transistor T1 connected to the eleventh transistor T11 and the first electrode of the storage capacitor Cst, that is, the gate node G_node, are initialized.

The fifth transistor T5 (hereinafter also referred to as a data node initialization transistor) includes a gate electrode connected to the second scan line 162 to which the second scan signal GC is applied, a first electrode receiving the reference voltage VREF, and a second electrode connected with a first electrode of the tenth transistor T10 and the second electrode of the second transistor T2. The fifth transistor T5 passes through the tenth transistor T10 and changes the second electrode of the storage capacitor Cst, and changes the second electrode of the hold capacitor Chold to the reference voltage VREF for initialization. Meanwhile, according to some embodiments, the driving voltage ELVDD may be applied to the first electrode of the fifth transistor T5 instead of the reference voltage VREF.

The sixth transistor T6 (hereinafter also referred to as a current transmission transistor) includes a gate electrode connected with the second light emission signal line 165 to which the second light emission signal EM2 is applied, a first electrode (input side electrode) connected with the second electrode of the driving transistor T1 and the first electrode of the third transistor T3, and a second electrode (output side electrode) connected with an anode of the light emitting diode LED and a second electrode of the seventh transistor T7. The sixth transistor T6 transmits or blocks the output current of the driving transistor T1 to the light emitting diode LED based on the second light emission signal EM2.

The seventh transistor T7 (hereinafter also referred to as an anode initialization transistor) includes a gate electrode connected with the fourth scan line 166 to which fourth scan signal EB is applied, a first electrode receiving the second initialization voltage VAINT, and a second electrode connected with the anode of the light emitting diode LED and the second electrode of the sixth transistor T6. The seventh transistor T7 serves to initialize the anode of the light emitting diode LED with the second initialization voltage VAINT. According to some embodiments, the seventh transistor T7 may be an oxide transistor including an oxide semiconductor, and may be turned on by a high-level voltage and turned off by a low-level voltage. In addition, according to some embodiments, the gate electrode of the seventh transistor T7 may be connected to a separate signal line instead of the fourth scan line 166. For example, the signal line may be one of light emission signal lines 164 and 166 to which light emitting signals EM1 and EM2 are applied The eighth transistor T8 (also referred to as a bias transistor) includes a gate electrode connected to the fourth scan line 166 to which the fourth scan signal EB is applied, a first electrode receiving the bias voltage Vbias, and a second electrode connected to the first electrode of the driving transistor T1 and the second electrode of the ninth transistor T9. The eighth transistor T8 transmits the bias voltage Vbias to the first electrode of the driving transistor T1 such that the characteristic of the driving transistor T1 can be maintained constant. For example, when the bias voltage Vbias is transmitted to the first electrode of the driving transistor T1, even if the driving transistor T1 does not receive a separate data voltage VDATA, the output current can be constantly generated with the previously received data voltage VDATA. Such an operation may serve to maintain the characteristics of the driving transistor T1 during high-speed driving or low-speed driving.

The ninth transistor T9 (hereinafter also referred to as a driving voltage transmission transistor) includes a gate electrode connected with the first light emission signal line 164 to which the first light emission signal EM1 is applied, a first electrode (input side electrode) receiving the driving voltage ELVDD, and a second electrode connected with the first electrode of the driving transistor T1 and the second electrode of the eighth transistor T8. The ninth transistor T9 transmits the driving voltage ELVDD to the first electrode of the driving transistor T1 such that the driving transistor T1 may generate a current.

The tenth transistor T10 (hereinafter also referred to as a data voltage transmission transistor) includes a gate electrode connected with a 2-1 scan line 167 (also referred to as a scan line for an oxide transistor) to which the 2-1 scan signal GC2 is applied, a first electrode connected with the second electrode of the second transistor T2 and the second electrode of the fifth transistor T5, and a second electrode connected with the second electrode of the storage capacitor Cst and the second electrode of the hold capacitor Chold. The tenth transistor T10 serves to change the voltage of the gate electrode of the driving transistor T1 by transmitting the data voltage VDATA to the second electrode of the storage capacitor Cst. In addition, depending on the timing, it may transmit the reference voltage VREF to the second electrode of the storage capacitor Cst. Here, a node to which the second electrode of the storage capacitor Cst and the second electrode of the hold capacitor Chold are connected is a node to which the data voltage VDATA is transmitted, and therefore is also referred to as a data node D_node. Meanwhile, the tenth transistor T10 may further include a first auxiliary electrode CMTL1 overlapping at least a part (e.g., a channel) of a semiconductor (e.g., oxide semiconductor) of the tenth transistor T10. Although it is illustrated in FIG. 1 that the first auxiliary electrode CMTL1 is shown as being connected to the 2-1 scan line 167 as a dotted line, this indicates that it is not connected to the 2-1 scan line 167 of this stage and can be connected to another part (e.g., one of the voltage lines or 2-1 scan line 167 at the previous or next stage). This will be described in detail with reference to FIG. 17 to FIG. 23.

The eleventh transistor T11 (a second compensation transistor) includes a gate electrode connected to the 2-1 scan line 167 to which the 2-1 scan signal GC2 is applied, a first electrode connected with the second electrode of the third transistor T3 and the second electrode of the fourth transistor T4, and a second electrode connected with the gate electrode of the driving transistor T1 and the first electrode of the storage capacitor Cst. The eleventh transistor T11 together with the third transistor T3 forms a compensation path that compensates for the threshold voltage of the driving transistor T1 such that the threshold voltage of the driving transistor T1 is stored in the first electrode of the storage capacitor Cst for compensation. As a result, although the threshold voltage of the driving transistor T1 included in each pixel is different, the driving transistor T1 may output a constant output current according to the applied data voltage VDATA. Meanwhile, the eleventh transistor T11 may further include a second auxiliary electrode CMTL2 overlapping at least a part (e.g., a channel) of a semiconductor (e.g., oxide semiconductor) of the eleventh transistor T11. Although it is illustrated in FIG. 1 that the first auxiliary electrode CMTL1 is shown as being connected (hereinafter also referred to be gate-sync) to the 2-1 scan line 167 as a dotted line, this indicates that it is not connected to the 2-1 scan line 167 of this stage and can be connected to another part (e.g., one of the voltage lines or 2-1 scan line 167 at the previous or next stage). This will be described in detail with reference to FIG. 17 to FIG. 23.

According to some embodiments as illustrated in FIG. 1, all transistors may be divided into p-type transistors formed using polycrystalline semiconductors and n-type transistors formed using oxide semiconductors. Referring to FIG. 1, the driving transistor T1, the second transistor T2, the third transistor T3, the fourth transistor T4, the fifth transistor T5, the sixth transistor T6, the seventh transistor T7, the eighth transistor T8, and the ninth transistor T9 are polycrystalline transistors including semiconductors, and the tenth transistor T10 and the eleventh transistor T11 are oxide transistors including oxide semiconductors. In addition, according to some embodiments as illustrated in FIG. 1, a polycrystalline transistor is a p-type transistor that can be turned on by a low-level voltage and turned off by a high-level voltage. In contrast, the oxide transistor is an n-type transistor, which can be turned on by a high-level voltage and turned off by a low-level voltage. According to some embodiments, the seventh transistor T7 may be an oxide transistor including an oxide semiconductor, and may be turned on by a high-level voltage and turned off by a low-level voltage.

The storage capacitor Cst (hereinafter also referred to as a voltage transmission capacitor) includes a first electrode connected with the gate electrode of the driving transistor T1 and the second electrode of the eleventh transistor T11, that is, the gate node G_node, and a second electrode (hereinafter also referred to as a second storage electrode) connected with the second electrode of the tenth transistor T10 and a second electrode of the hold capacitor Chold, that is, the data node D_node.

The storage capacitor Cst may receive the data voltage VDATA through the second transistor T2 and the tenth transistor T10 or receive the reference voltage VREF through the fifth transistor T5 and the tenth transistor T10 to change a voltage of the gate electrode of the driving transistor T1, and maintains the received voltage until the next voltage is transmitted. In the pixel according to some embodiments, the data voltage VDATA is not directly transmitted to the gate electrode of the driving transistor T1, but through the storage capacitor Cst. This is a method of indirectly transmitting the data voltage VDATA to the gate electrode of the driving transistor T1 by using the fact that when the voltage of the second electrode of the storage capacitor Cst suddenly rises, the voltage of the first electrode, the other electrode, also rises.

According to such a method, although a leakage occurs in at least one transistor (e.g., the second transistor T2 and the like) among the transistors included in the pixel, the voltage of the gate electrode of the driving transistor T1 does not directly leak and thus the effect is insignificant. In addition, according to some embodiments, the data voltage VDATA passes through the storage capacitor Cst without passing through other electrodes of the driving transistor T1 and is directly transmitted to the gate electrode of the driving transistor T1, and thus even if there is a difference in the driving voltage ELVDD depending on the position of the pixel, there is also merit in determining the voltage stored in the storage capacitor Cst without being affected by the difference in the driving voltage ELVDD.

The hold capacitor Chold includes a first electrode (hereinafter referred to as a first hold electrode) receiving the driving voltage ELVDD, a second electrode (hereinafter also includes a second hold electrode) connected with the second electrode of the storage capacitor Cstm and the second electrode of the tenth transistor T10, that is, the second electrode connected to the data node D_node, and serves to maintain the voltage of the second electrode of the storage capacitor Cst, that is, the voltage of the data node D_node constant. That is, according to the hold capacitor Chold, the voltage of the second electrode of the storage capacitor Cst, that is, the data node D_node, does not fluctuate and may have a constant voltage even when the surrounding signal fluctuates.

The light emitting diode LED includes the anode connected to the second electrode of the sixth transistor T6 and the second electrode of the seventh transistor T7, and a cathode connected to the driving low voltage ELVSS. The light emitting diode LED may emit light with luminance corresponding to the current supplied from the pixel circuit portion (to be precise, the driving transistor T1) by positioning it between the pixel circuit portion and the driving low voltage ELVSS. The light emitting diode LED may include an emission layer including at least one of an organic light emitting material or an inorganic light emitting material. Holes and electrons are injected into the emission layer from the anode and cathode, respectively, and light emission occurs when the exciton combined with the injected holes and electrons falls from the excited state to the ground state. The light emitting diode LED may emit light of one of the primary colors or white light. Examples of primary colors include three primary colors of red, green, and blue. Other examples of primary colors include yellow, cyan, and magenta. According to some embodiments, additional color filters or color conversion layers may be further included to improve color display characteristics.

In the pixel according to some embodiments as illustrated in FIG. 1, two transistors (second transistor T2 and tenth transistor T10) and the storage capacitor Cst are positioned on a path where the data voltage VDATA is transmitted to the driving gate electrode 1151 (hereinafter referred to as a data voltage transmission path). That is, the storage capacitor Cst and the tenth transistor T10 are positioned between the driving gate electrode of the driving transistor T1 and the second transistor T2. In this case, the data voltage VDATA is not directly transmitted to the driving gate electrode of the driving transistor T1, but is transmitted to the second storage electrode of the storage capacitor Cst. When the voltage of the second storage electrode is changed while the data voltage VDATA is applied to the second storage electrode, the voltage of the first storage electrode and the voltage of the driving gate electrode are changed and the data voltage VDATA is indirectly transmitted. Two transistors (second transistor T2 and tenth transistor T10) are turned on together and applied to transmit the data voltage VDATA. In addition, the tenth transistor T10 has a different characteristic from the driving transistor T1 and the second transistor T2, and the two transistors included in the data voltage transmission path have different characteristics. That is, the driving transistor T1 and the second transistor T2 are formed of p-type polycrystalline transistors, but the tenth transistor T10 is formed of an n-type oxide transistor. In addition, as described later with reference to FIG. 17 to FIG. 23, the tenth transistor T10 adjusts a voltage applied to the first auxiliary electrode CMTL1 to adjust characteristic of the tenth transistor T10 such that the data voltage VDATA can be sufficiently charged in the storage capacitor Cst even for a short time, thereby improving display quality of the light emitting display device even at high speed.

The pixel according to some embodiments as illustrated in FIG. 1 further includes a hold capacitor Chold in addition to the storage capacitor Cst to maintain the voltage of the data node D_node, that is, the data voltage VDATA input to the pixel more constant. Referring to FIG. 3 to FIG. 16, the driving gate electrode, the storage capacitor Cst, and the hold capacitor Chold of the driving transistor T1 may be formed while overlapping on a plane.

In the pixel according to some embodiments as illustrated in FIG. 1, two transistors (third transistor T3 and eleventh transistor T11) are formed on a compensation path that compensates for the threshold voltage of driving transistor T1 and they should be turned on together for compensation of the threshold voltage of the driving transistor T1. In addition, the eleventh transistor T11 has a different characteristic from the driving transistor T1 and the third transistor T3, and the two transistors included in the compensation path have different characteristics. That is, the driving transistor T1 and the third transistor T3 are formed of p-type polycrystalline transistors, but the eleventh transistor T11 is formed of an n-type oxide transistor. In addition, as described later with reference to FIG. 17 to FIG. 23, the eleventh transistor T11 adjusts a voltage applied to the second auxiliary electrode CMTL2 to adjust characteristic of the eleventh transistor T11 such that the compensation operation can be performed even for a short time, thereby improving display quality of the light emitting display device even at high speed.

Hereinafter, operation of the pixel in the case of applying a signal of the waveform of FIG. 2 to the pixel of FIG. 1 will be described in detail.

Figure 2:
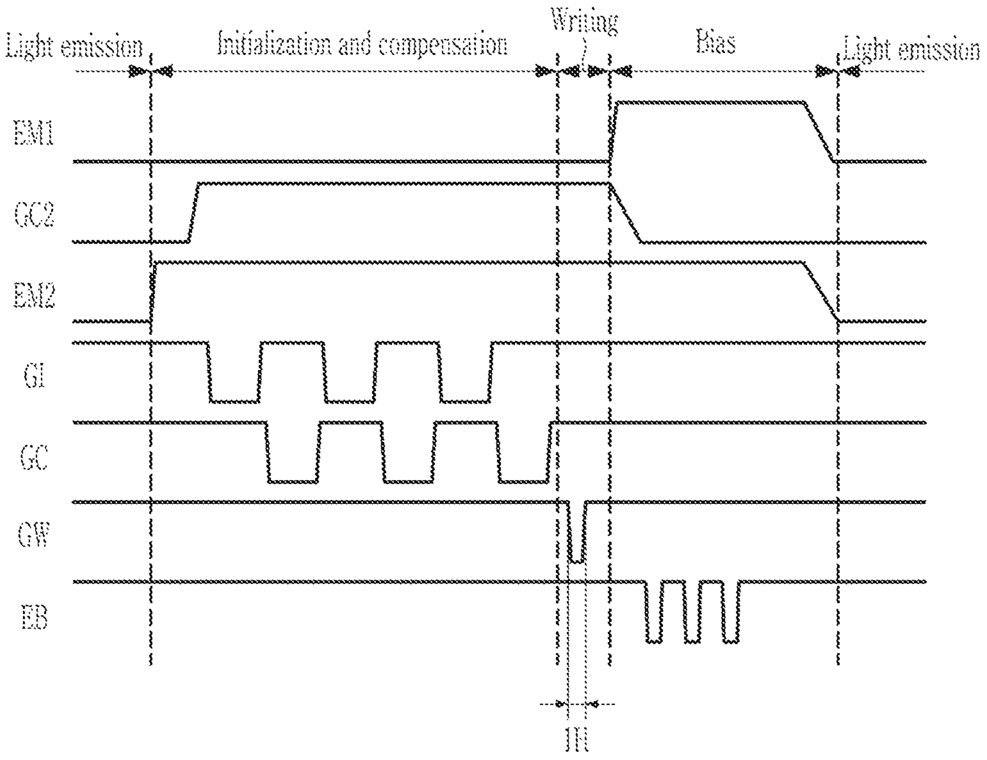
FIG. 2 is a waveform diagram of a signal applied to the pixel of FIG. 1 according to some embodiments.

FIG. 2 is a waveform diagram of a signal applied to the pixel of FIG. 1.

Referring to FIG. 2, when the signal applied to the pixel is divided into periods, it is divided into an initialization and compensation periods, a writing period, a bias period, and an emission period.

First, the emission period is a period during which the light emitting diode LED emits light, and a gate-on voltage (low-level voltage) is applied to first and second light emitting signals EM1 and EM2 and thus the sixth transistor T6 and the ninth transistor T9 are turned on. A driving voltage ELVDD is applied to the driving transistor T1 and an output current is generated according to the voltage of driving gate electrode (or first storage electrode), and the output current of the driving transistor T1 passes through the turned-on sixth transistor T6 and is transmitted to the light emitting diode LED do. Therefore, in the light emission period, the light emitting diode LED emits light according to the intensity of the received output current. In FIG. 2, although the light emission period in which a light emission signal applies the gate-on voltage (low level voltage) is hardly shown, the light emission period substantially has the longest time. However, the light emission period performs only the simple operation as described above and thus it is shown simply in FIG. 2

When the light emission period ends, it enters the initialization and compensation period. Here, in the initialization and compensation period, some electrodes and nodes are initialized while other electrodes and nodes perform compensation operations.

The light emission period ends when the second light emission signal EM2 changes to a gate-off voltage (high level voltage). The sixth transistor T6 to which the second light emission signal EM2 is applied is changed to a turned-off state, and the ninth transistor T9, to which the first light emission signal EM1 is applied, remains turned on and thus the driving voltage ELVDD is continuously applied to the first electrode of the driving transistor T1. A period where the gate-off voltage of the second light emission signal EM2 is applied includes the initialization and compensation period, a write period, and a bias period.

After the second light emission signal EM2 is changed to the gate-off voltage, the 2-1 scan signal GC2 is changed to a gate-on voltage (i.e., a high-level voltage) and the third scan signal GI is changed to a gate-on voltage (i.e., a low-level voltage). As a result, the tenth transistor T10 and the eleventh transistor T11 receiving 2-1 the scan signal GC2 are turned on, and the fourth transistor T4 receiving the third scan signal GI is turned on.

The first initialization voltage VINT is transmitted to a second electrode of the third transistor T3 and a first electrode of the eleventh transistor T11 that are connected with the second electrode of the fourth transistor T4 by the turned-on fourth transistor T4. In this case, because the eleventh transistor T11 is turned on, the first initialization voltage VINT is transmitted to a gate node gate node G_node, and thus the driving gate electrode of the driving transistor T1 and the first storage electrode of the storage capacitor Cst are initialized with the first initialization voltage VINT. Here, the first initialization voltage VINT may have a low-level voltage value, and according to some embodiments, the first initialization voltage VINT may be a low voltage that can turn on the driving transistor T1.

Meanwhile, in this case, the turned-on tenth transistor T10 does not perform a particular operation.

After that, as the third scan signal GI is changed to a gate-off voltage (i.e., high-level voltage), the second scan signal GC is changed to a gate-on voltage (i.e., low-level voltage). In this case, the 2-1 scan signal GC2 maintains a gate-on voltage (high level voltage).

As a result, the fourth transistor T4 is turned off, and according to the second scan signal GC, the third transistor T3 and the fifth transistor T5 are turned on. In this case, the tenth transistor T10 and the eleventh transistor T11 remain turned on, and the ninth transistor T9 also remains turned on.

A reference voltage VREF is transmitted to a data node D_node by the turned-on fifth transistor T5 and the turned-on tenth transistor T10 and thus the second storage electrode and a second electrode of a hold capacitor Chold are initialized with the reference voltage VREF. Due to the reference voltage VREF, the voltage at one end of each capacitor (the second electrode of storage capacitor Cst and the second electrode of hold capacitor Chold) becomes constant.

In addition, an operation for compensating the threshold voltage of the driving transistor T1 is performed by the turned on third transistor T3 and eleventh transistor T11. The first initialization voltage VINT applied to the gate node G_node is also transmitted to the second electrode of the driving transistor T1 by the turned-on third transistor T3 and eleventh transistor T11. In this case, the driving transistor T1 has a diode connection structure in which the driving gate electrode and the second electrode are connected. The driving transistor T1 is in a turn-on state by the first initialization voltage VINT, the driving voltage ELVDD transmitted to the first electrode of the driving transistor T1 passes through the second electrode of the driving transistor T1, the third transistor T3, and the eleventh transistor T11 and are transmitted to the driving gate electrode of the driving transistor T1 and the first electrode of the storage capacitor Cst. Accordingly, the driving transistor T1 is turned off when the voltage of the driving gate electrode of the driving transistor T1 gradually rises from the first initialization voltage VINT and then lower than the driving voltage ELVDD as much as the driving transistor T1 threshold voltage. The voltage of the driving gate electrode when the driving transistor T1 is turned off is stored in the first storage electrode of the storage capacitor Cst, and the voltage of the first storage electrode of the storage capacitor Cst may be as shown in Equation 1 below.

$$Vcst1=V_{ELVDD}-Vth \quad \text{[Equation 1]}$$

Here, Vcst1 denotes a voltage of the first storage electrode of the storage capacitor Cst, $V_{ELVDD}$ denotes a voltage value of the driving voltage ELVDD, and Vth denotes a threshold voltage value of the driving transistor T1.

According to Equation 1, the threshold voltage Vth value that may have different values for each driving transistor T1 can be compensated.

After passing through the compensation period as described above, the second storage electrode of the storage capacitor Cst has a reference voltage VREF, and the first storage electrode has a voltage value of Equation 1.

The initialization and compensation period may be divided into a first period during which the gate-on voltage (low level voltage) is applied as the third scan signal GI and the gate-off voltage (high level voltage) is applied as the second scan signal GC, and a second period during which the gate-off voltage (high level voltage) is applied as the third scan signal GI and the gate-on voltage (low level voltage) is applied as the second scan signal GC. Referring to FIG. 2, the initialization and compensation period includes the first section and the second section alternately multiple times. According to some embodiments as illustrated in FIG. 2, the first section and the second section are performed three times, respectively. However, according to some embodiments, the initialization and compensation period may include one first period and one second period.

According to some embodiments as illustrated in FIG. 2, as the second scan signal GC and the third scan signal GI are changed to the gate-off voltage (high level voltage), the initialization and compensation period ends and the writing period starts.

In the writing period, the gate-off voltage (high level voltage) is applied as the second scan signal GC, the third scan signal GI, and the second light emission signal EM2, the gate-on voltage is applied as the 2-1 scan signal GC2 and the first light emission signal EM1, and as the first scan signal GW is changed to the gate-on voltage (voltage at a low level) for 1H, and the data voltage VDATA enters the pixel.

In the writing period, the second transistor T2 receiving the first scan signal GW is turned on, and thus the data voltage VDATA is output to the second electrode of the second transistor T2 and then transmitted to the second electrode of the storage capacitor Cst and the second electrode of the hold capacitor Chold through the tenth transistor T10.

In the write period, the second electrode of the storage capacitor Cst is changed from the reference voltage VREF, which is the voltage applied to the compensation period, to the data voltage VDATA value. In this case, the voltage value of the first electrode of the storage capacitor Cst is changed in proportion to the voltage change amount of the second electrode of the storage capacitor Cst. That is, because the voltage change of the second electrode of the storage capacitor Cst is the voltage difference between the data voltage VDATA and the reference voltage VREF, the voltage of the first electrode of the storage capacitor Cst is additionally changed by a value proportional to the voltage difference of the data voltage VDATA and the reference voltage VREF from the voltage value of Equation 1. In this case, the voltage value of the first electrode of the storage capacitor Cst may be lowered. As much as the voltage value of the gate electrode of the driving transistor T1 is lowered, the degree to which the driving transistor T1 is turned on is determined and the intensity of the output current is determined.

In FIG. 2, the gate-on voltage (low level voltage) of the first scan signal GW may be maintained for 1H, 1H represents one horizontal period, and one horizontal period may correspond to one horizontal synchronizing signal Hsync. 1H may mean a time when a gate-on voltage is applied to a scan line of a next row after a gate-on voltage is applied to one scan line. Referring to FIG. 2, it can be confirmed that the initialization and compensation period, the bias period, and the light emission period are longer than the writing period of 1H, and the threshold voltage of the driving transistor T1 can be sufficiently compensated by making the compensation period have a time of 3H or longer according to some embodiments. In other words, when the initialization and compensation period in which the pixel compensates for the threshold voltage of the driving transistor T1 and the writing period in which the data voltage VDATA is written are separated and the compensation time is extended three times longer than the writing period (1H) to perform high-speed driving, a time of 3H or more is assured to prevent or reduce the compensation time from being insufficient even through 1H is very short such that sufficient compensation can be achieved during high-speed driving.

After that, as the gate-off voltage is changed to the 2-1 scan signal GC2 and the first light emission signal EM1, the writing period is ended and the bias period is started.

In the bias section, the gate-on voltage (low level voltage) is applied as the fourth scan signal EB, and the anode of the light emitting diode LED is initialized to the second initialization voltage VAINT by the seventh transistor T7 receiving the fourth scan signal EB.

In addition, the bias voltage Vbias is applied to the first electrode of the driving transistor T1 by the eighth transistor T8 receiving the fourth scan signal EB. The characteristic of the driving transistor T1 to which the bias voltage Vbias is applied can be maintained constantly, and particularly, even if a separate data voltage VDATA is not input to the pixel, the driving transistor T1 may generate a constant output current with the previously received data voltage VDATA. Such an operation serves to maintain the characteristics of the driving transistor T1 during high-speed driving or low-speed driving, and can also reduce power consumption.

Referring to FIG. 2, a period during which the fourth scan signal EB maintains the gate-on voltage (low level voltage) may be 1H, and the fourth scan signal EB maintains the gate-on voltage (low level voltage) multiple times.

FIG. 2 illustrates aspects of some embodiments in which the fourth scan signal EB applies the gate-on voltage (low level voltage) three times.

After that, as the first light emission signal EM1 and the second light emission signal EM2 are changed to the gate-on voltage (voltage at a low level), the light emission period is started. In this case, the driving transistor T1 receives the driving voltage ELVDD, generates an output current according to the voltage of the driving gate electrode (voltage of the first storage electrode), and outputs it to the anode of the light emitting diode LED. As a result, the light emitting diode LED receives the output current of the driving transistor T1 and emits light.

Hereinabove, the circuit structure and the operation of the pixel have been described.

Hereinafter, a planar structure of the pixel circuit portion of the pixel according to some embodiments will be described in more detail with reference to FIG. 3 to FIG. 15, and a cross-sectional structure of the pixel circuit portion will be described with reference to FIG. 16.

First, a planar structure will be mainly described with reference to FIG. 3 to FIG. 15, while referring to FIG. 16, and in FIG. 3 to FIG. 15, the light emitting diode LED is not illustrated, and the structure of the pixel circuit portion positioned below the light emitting diode LED is mainly illustrated.

FIG. 3 to FIG. 15 illustrate a structure of each layer according to a manufacturing process of the light emitting display device according to some embodiments.

Figure 3:
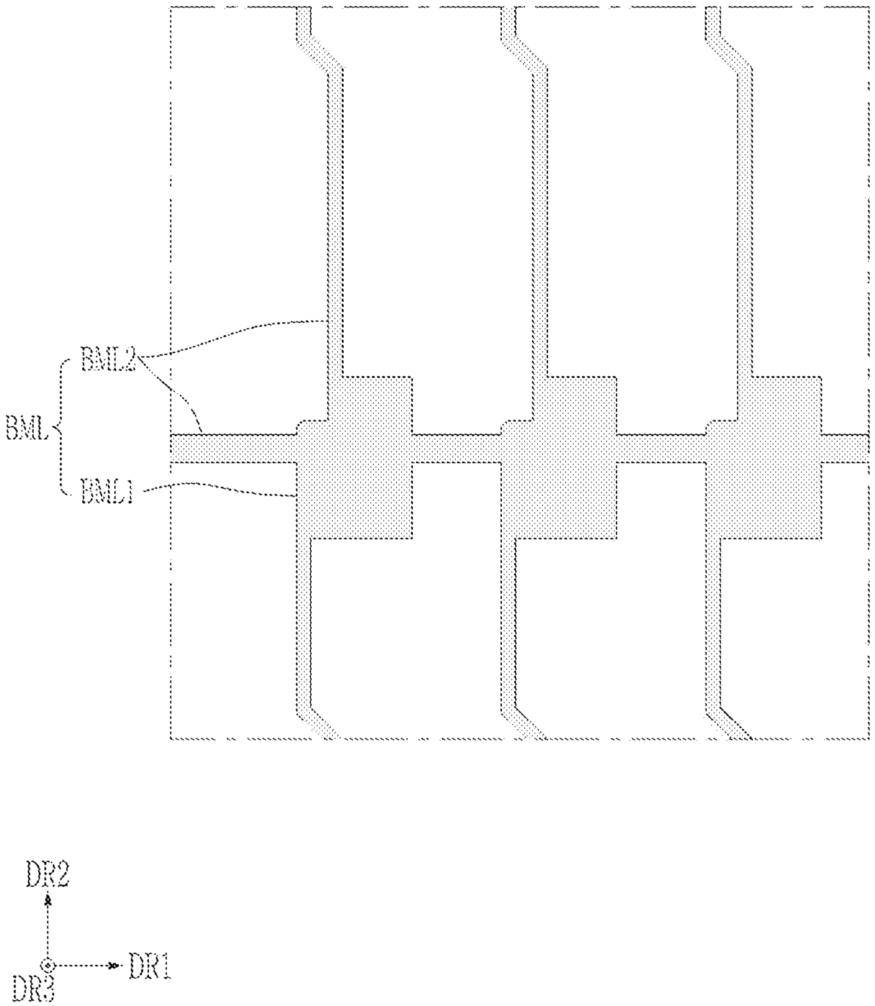
FIG. 3 to FIG. 15 illustrate a structure of each layer according to a manufacturing process of the light emitting display device according to some embodiments.
Figure 16:
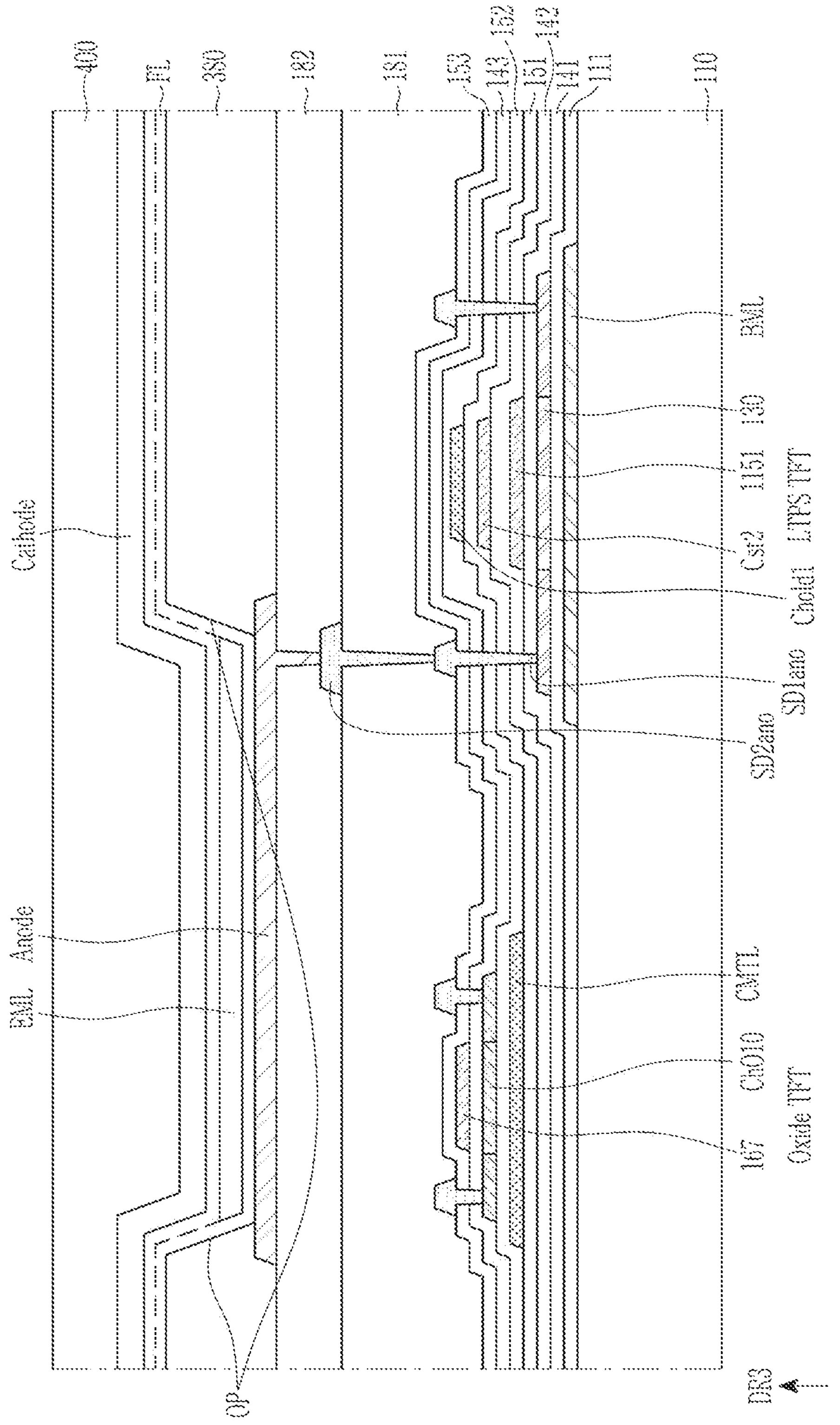
FIG. 16 is a cross-sectional view of a light emitting display device according to some embodiments.

First, referring to FIG. 3, the overlapping electrode BML is positioned on a substrate 110 (refer to FIG. 16).

The substrate 110 may include a material that has rigid characteristics such as glass and does not bend, or may include a flexible material that can bend, such as plastic or polyimide. In the case of a flexible substrate, a double layer structure of polyimide and a barrier layer formed of an inorganic insulating material thereon may be formed.

The overlapping electrode BML includes a plurality of expansion portions BML1 and a connection portion BML2 connecting the plurality of extension portions BML1 to each other. The extension portion BML1 of the overlapping electrode BML may be formed at a position overlapping the channel 1131 of the driving transistor T1 in a plan view among the subsequent first semiconductor layers. The overlapping electrode BML is also called a lower shielding layer, and may include a metal such as copper (Cu), molybdenum (Mo), aluminum (Al), and titanium (Ti), or a metal alloy thereof, and may additionally include amorphous silicon and may be formed of a single layer or multiple layers.

Referring to FIG. 16, the buffer layer 111 covering the substrate 110 and the overlapping electrode BML are positioned on them. The buffer layer 111 serves to block penetration of impurity elements into the first semiconductor layer 130, and may be an inorganic insulating layer including a silicon oxide ($SiO_x$), a silicon nitride ($SiN_x$), or a silicon oxynitride ($SiO_xN_y$).

Figure 4:
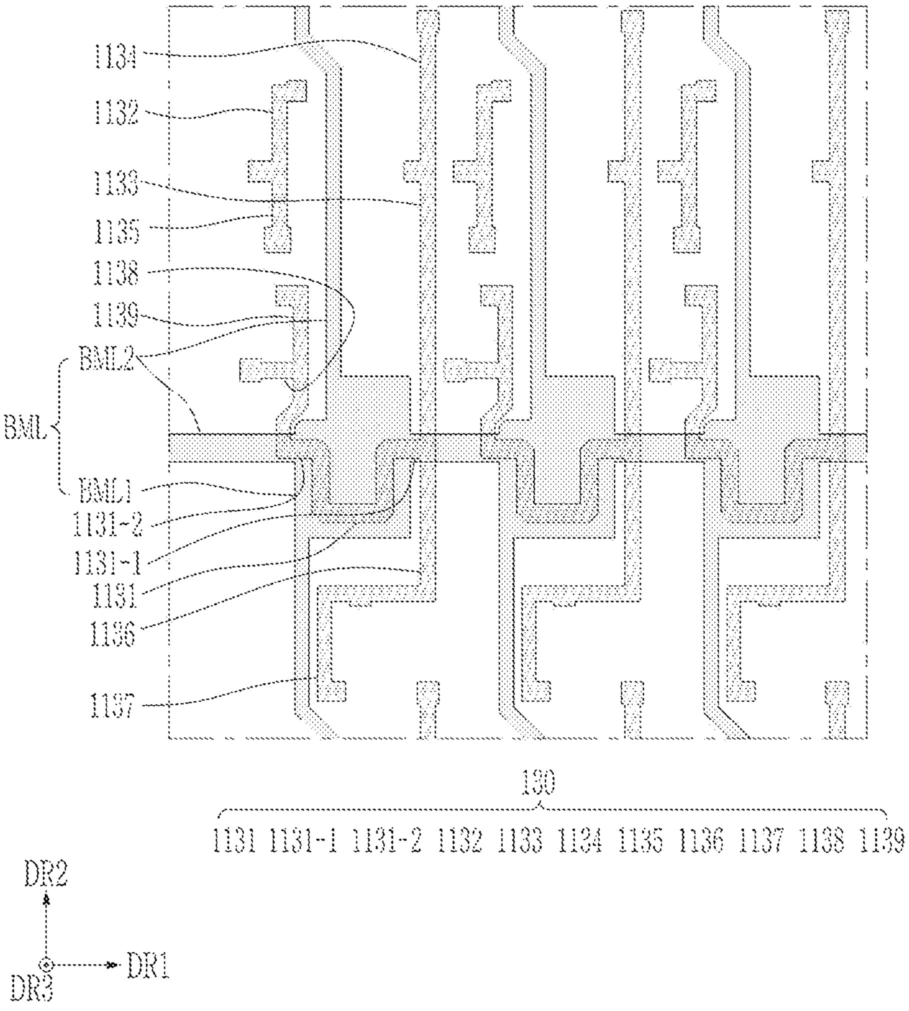

As shown in FIG. 4, the first semiconductor layer 130 formed of a silicon semiconductor (e.g., polycrystalline semiconductor) is positioned on the buffer layer 111. The first semiconductor layer 130 includes a channel 1131, a first area 1131-1, and a second area 1131-2 of the driving transistor T1. In addition, the first semiconductor layer 130 includes not only the driving transistor T1 but also a channel of each of the second transistor T2, the fifth transistor T5, the sixth transistor T6, the seventh transistor T7, the eighth transistor T8, and the ninth transistor T9, and includes portions 1132, 1133, 1134, 1135, 1136, 1137, 1138, and 1139 each having a conductive layer characteristic by plasma treatment or doping on both sides of each channel, to thereby serve as a first electrode and a second electrode.

The channel 1131 of the driving transistor T1 may be formed in a shape bent in a U shape on a plane. However, the shape of the channel 1131 of the driving transistor T1 is not limited thereto and may be variously changed. For example, the channel 1131 of the driving transistor T1 may be bent in various other shapes such as an S shape or may be formed in a bar shape. The first area 1131-1 and the second area 1131-2 of the driving transistor T1 may be positioned on both sides of the channel 1131 of the driving transistor T1. The first area 1131-1 and the second area 1131-2 positioned on the first semiconductor layer serve as the first electrode and second electrode of the driving transistor T1.

Semiconductors 1138 and 1139 including a part that serves as a channel, a first electrode, and a second electrode of the eighth transistor T8 and the ninth transistor T9 are positioned in a portion extending from the first area 1131-1 of the driving transistor T1 to an upper side (second direction DR2) in the first semiconductor layer 130. The semiconductor 1138 of the eighth transistor T8 extends upward from the first area 1131-1 of the driving transistor T1 and then is positioned while bending the opposite direction of the first direction DR1. The semiconductor 1139 of the ninth transistor T9 extends upward from the first area 1131-1 of the driving transistor T1 and is positioned past the semiconductor 1138 of the eighth transistor T8.

In the second area 1131-2 of the driving transistor T1 in the first semiconductor layer 130, a portion extending upward (second direction DR2) and a portion extending downward (opposite direction of second direction DR2) are connected.

A semiconductor 1136 of the sixth transistor T6 is positioned in a portion that extends downward in the second area 1131-2 of the driving transistor T1 in the first semiconductor layer 130, and a semiconductor 1137 of the seventh transistor T7 is positioned while extending in the opposite direction of the second direction DR2 after passing through the portion and being bent in the opposite direction of the first direction DR.

A semiconductor 1133 of the third transistor T3 and a semiconductor 1134 of the fourth transistor T4 are sequentially positioned in a portion that extends upward in the second area 1131-2 of the driving transistor T1 in the first semiconductor layer 130.

Meanwhile, the first semiconductor layer 130 further includes a separate semiconductor layer, and the semiconductor 1132 of the second transistor T2 and the semiconductor 1135 of the fifth transistor T5 are positioned. The separately separated semiconductor layer is positioned away from the second direction DR2 in a portion extending from the first area 1131-1 to the upper side (second direction DR2) of the driving transistor T1.

Referring to FIG. 16, a first gate insulation layer 141 may be positioned on the first semiconductor layer 130 including the channel 1131, the first area 1131-1, and the second area 1131-2 of the driving transistor T1.

The first gate insulating layer 141 may be positioned on the entire surface of the first semiconductor layer 130 and the buffer layer 111. According to some embodiments, the first gate insulating layer 141 may not be positioned on the entire surface of the first semiconductor layer 130 and the buffer layer 111, but may be positioned only in some regions. For example, the first gate insulating layer 141 may have a structure that overlaps a channel of each transistor of the first semiconductor layer 130 but does not overlap a first area and a second area positioned on both sides thereof.

The first gate insulating layer 141 may be an inorganic insulating layer including a silicon oxide ($SiO_x$), a silicon nitride ($SiN_x$), a silicon oxynitride ($SiO_xN_y$), or the like.

Figure 5:
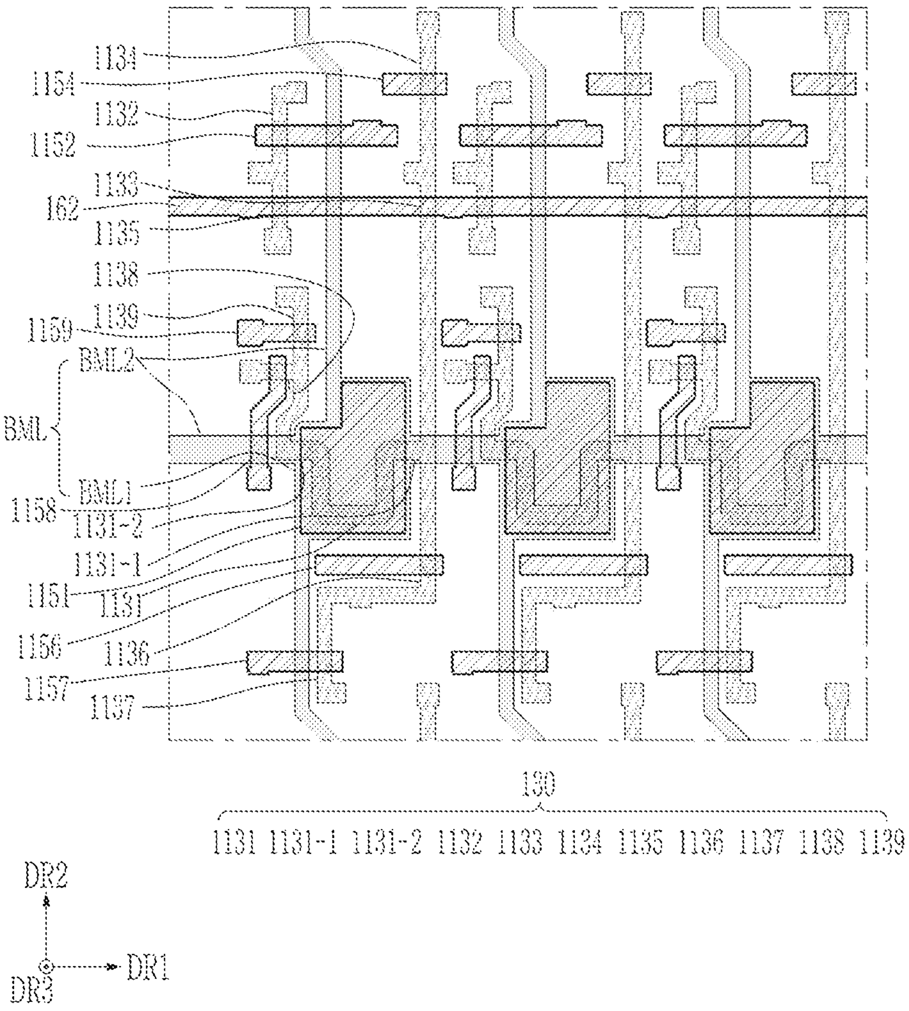

Referring to FIG. 5, a first gate conductive layer including the driving gate electrode 1151 of the driving transistor T1 and the second scan line 162 may be positioned on the first gate insulating layer 141. The first gate conductive layer includes not only the driving gate electrode 1151 of the driving transistor T1, but also the gate electrode of the second transistor T2 to the ninth transistor T9.

Referring to FIG. 5, a gate electrode of the second transistor T2 and a gate electrode of the third transistor T3 are positioned on one part of the second gate electrode 1152, and a portion of the second gate electrode 1152 overlapping the semiconductor 1132 forms a gate electrode of the second transistor T2, and a portion overlapping the semiconductor 1133 forms a gate electrode of the third transistor T3.

The gate electrode of the fourth transistor T4 is positioned at a portion of the fourth gate electrode 1154 overlapping the semiconductor 1134, and the gate electrode of the fifth transistor T5 is positioned at a portion of the second scan line 162 overlapping the semiconductor 1135. The gate electrode of the sixth transistor T6 is positioned at a portion overlapping the semiconductor 1136 of the sixth gate electrode 1156, and the gate electrode of the seventh transistor T7 is positioned at a portion overlapping portion of the semiconductor 1137 of the seventh gate electrode 1157. A gate electrode of the eighth transistor T8 is positioned at a portion overlapping the semiconductor 1138 of the eighth gate electrode 1158, and the gate electrode of the ninth transistor T9 is positioned at a portion overlapping the semiconductor 1139 of the ninth gate electrode 1159.

The first gate conductive layer may include a metal such as copper (Cu), molybdenum (Mo), aluminum (Al), and titanium (Ti), or a metal alloy thereof, and may be formed of a single layer or multiple layers.

After forming the first gate conductive layer, a plasma treatment or doping process may be performed to make a portion of the first semiconductor layer 130 not covered with the first gate conductive layer conductive. That is, the first semiconductor layer 130 covered by the first gate conductive layer is not conductive, and a portion of the first semiconductor layer 130 not covered by the first gate conductive layer may have the same characteristics as the conductive layer.

Referring to FIG. 16, a second gate insulating layer 142 may be positioned on the first gate conductive layer and the first gate insulating layer 141. The second gate insulating layer 142 may be an inorganic insulating layer including a silicon oxide ($SiO_x$), a silicon nitride ($SiN_x$), a silicon oxynitride ($SiO_xN_y$), or the like.

Figure 6:
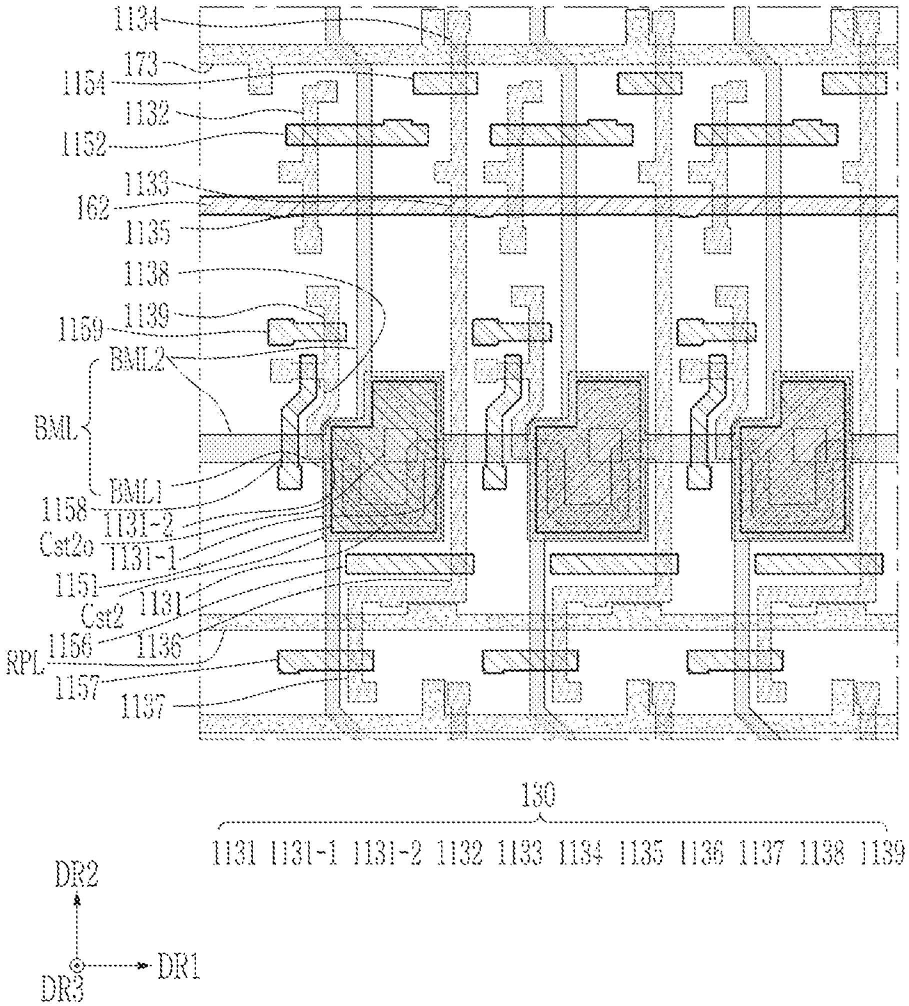

Referring to FIG. 6, a second gate conductive layer may be formed on the second gate insulating layer 142. The second gate conductive layer includes a second storage electrode Cst2 of the storage capacitor Cst, a first initialization voltage line 173, and a repay line RPL.

The second storage electrode Cst2 of the storage capacitor Cst has the same shape as the driving gate electrode 1151 of the driving transistor T1. The second storage electrode Cst2 of the storage capacitor Cst includes an opening Cst2*o* overlapping a portion of the driving gate electrode 1151 of the driving transistor T1.

The second gate insulating layer 142 positioned between a cross-section of the second storage electrode Cst2 and the driving gate electrode 1151 of the driving transistor T1 also has an opening at a portion corresponding to the opening Cst2*o* of the second storage electrode Cst2, and the driving gate electrode of the driving transistor T1 1151 is exposed to the top and thus can be connected to the upper conductive layer. Here, the opening formed in the second gate insulating layer 142 is an opening OP1 shown in, which may be formed in a subsequent process. The driving gate electrode 1151 of the driving transistor T1 overlapping the second storage electrode Cst2 and the second gate insulating layer 142 positioned therebetween form the storage capacitor Cst, and in this time, the driving gate electrode 1151 is also the first storage electrode of the storage capacitor Cst while being the gate electrode of the driving transistor T1.

The first initialization voltage line 173 has a structure extending to the first direction DR1 and transmits the first initialization voltage VINT. The first initialization voltage line 173 includes a plurality of protruding portions, and at least one of the protruding portions is connected with the fourth transistor T4 and another one may have a structure that is connected with an additional initialization voltage line extending in the second direction DR2 in a conductive layer (e.g., a second data conductive layer) formed in a subsequent process.

In addition, a repay line RPL extended to the first direction DR1 is also formed, the repay line RPL is usually floating, but when a pixel that needs repair occurs, it may serve to transmit a current to an anode of the pixel that needs repair through a short circuit.

The second gate conductive layer may include a metal such as copper (Cu), molybdenum (Mo), aluminum (Al), and titanium (Ti), or a metal alloy thereof, and may be formed of a single layer or multiple layers.

Referring to FIG. 16, a first interlayer insulating layer 151 may be positioned on the second gate conductive layer. The first interlayer insulating layer 151 may include an inorganic insulating layer including a silicon oxide ($SiO_x$), a silicon nitride ($SiN_x$), or a silicon oxynitride ($SiO_xN_y$), and according to some embodiments, an inorganic insulating material may be formed thickly or an organic material may be included.

Figure 7:
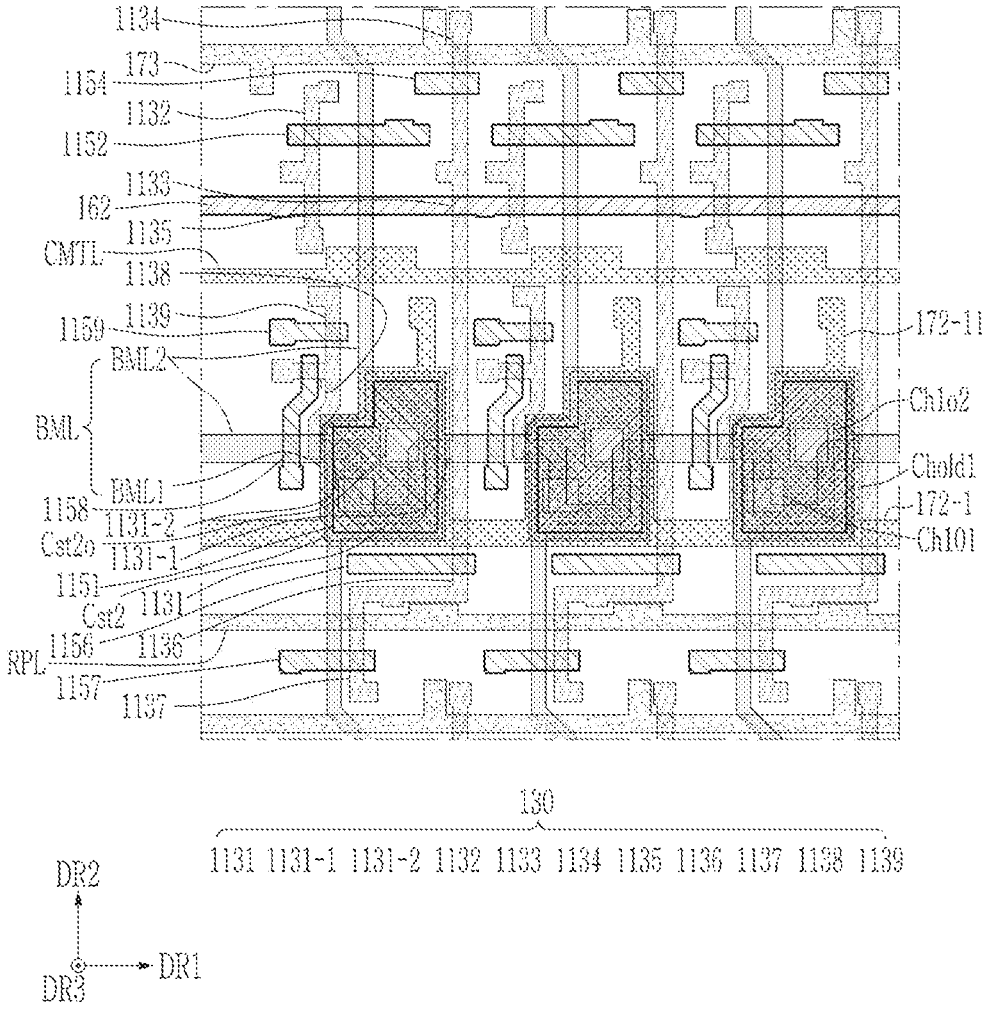

Referring to FIG. 7, an auxiliary conductive layer is formed on the first interlayer insulating layer 151.

The auxiliary conductive layer includes a first driving voltage line 172-1 and an auxiliary electrode line CMTL including a first hold electrode Chold1 of a hold capacitor Chold.

The first hold electrode Chold1 of the hold capacitor Chold has a similar shape to the driving gate electrode 1151 and second storage electrode Cst2 of the driving transistor T1. That is, the first hold electrode Chold1 includes a portion having the same/similar shape to the driving gate electrode 1151 and the second storage electrode Cst2 of the driving transistor T1 and a protruding portion 172-11 protruded to the second direction DR2. The protruding portion 172-11 is connected to the ninth transistor T9 through a subsequent process.

In addition, the first hold electrode Chold1 has two openings Ch1*o*1 and Ch1*o*2.

The first opening Ch1*o*1 overlaps a part of the second storage electrode Cst2 such that the second storage electrode Cst2 may be exposed. The first interlayer insulating layer 151 positioned between the cross-section of the first hold electrode Chold1 and the second storage electrode Cst2 also has an opening at a portion corresponding to the first opening Ch1*o*1 of the first hold electrode Chold1, and thus the second storage electrode Cst2 is exposed to an upper part such that it can be connected to the conductive layer thereabove. Here, the opening formed in the first interlayer insulating layer 151 is shown may be an opening OP2 formed in a subsequent process shown in FIG. 10.

The second opening Ch1*o*2 overlaps a portion of the driving gate electrode 1151 of the driving transistor T1 and the opening Cst2*o* of the second storage electrode Cst2. The first interlayer insulating layer 151 positioned between a cross-section of the first hold electrode Chold1 and the second storage electrode Cst2 also has an opening at a portion corresponding to the second opening Ch1*o*2 of the first hold electrode Chold1, and the driving gate electrode 1151 of the driving transistor T1 is exposed upward along with the opening formed in the opening Cst2*o* of the second storage electrode Cst2 and the second gate insulating layer 142 to be connected to the upper conductive layer. Here, the opening formed in the second gate insulating layer 142 and first interlayer insulating layer 151 may be the opening OP1 formed in a subsequent process shown in FIG. 10.

The second storage electrode Cst2 overlapping the first hold electrode Chold1 and the first interlayer insulating layer 151 positioned therebetween form the hold capacitor Chold, and in this case, the second storage electrode Cst2 is the second electrode of the storage capacitor Cst and at the same time the second hole electrode of the hold capacitor Chold.

Referring to FIG. 7, the first hold electrode Chold1 has a structure connected to the first hold electrode Chold1 adjacent to the first direction DR1, and a wiring structure connected to the first direction DR1 forms the first driving voltage line 172-1. The driving voltage ELVDD is applied to the first driving voltage line 172-1, and serves to transmit the driving voltage ELVDD to the first direction DR1.

The auxiliary electrode line CMTL has a structure extended to the first direction DR1, and a voltage having a constant voltage level or a voltage with a changing voltage level may be applied. The auxiliary electrode line CMTL overlaps at least a part of oxide semiconductor layers of oxide transistors (tenth transistor T10 and eleventh transistor T11) formed in a subsequent process, and may also serve as a lower shielding layer. The characteristics of the oxide transistor change according to the voltage applied to the auxiliary electrode line CMTL, and this will be described with detail with reference to FIG. 17 to FIG. 23.

The auxiliary conductive layer may include a metal such as copper (Cu), molybdenum (Mo), aluminum (Al), and titanium (Ti), or a metal alloy thereof, and may be formed of a single layer or multiple layers.

Referring to FIG. 16, the second interlayer insulating layer 152 may be positioned on the auxiliary conductive layer. The second interlayer insulating layer 152 may include an inorganic insulating layer including a silicon oxide ($SiO_x$), a silicon nitride ($SiN_x$), or a silicon oxynitride ($SiO_xN_y$), and according to some embodiments, an inorganic insulating material may be formed thickly or an organic material may be included.

Figure 8:
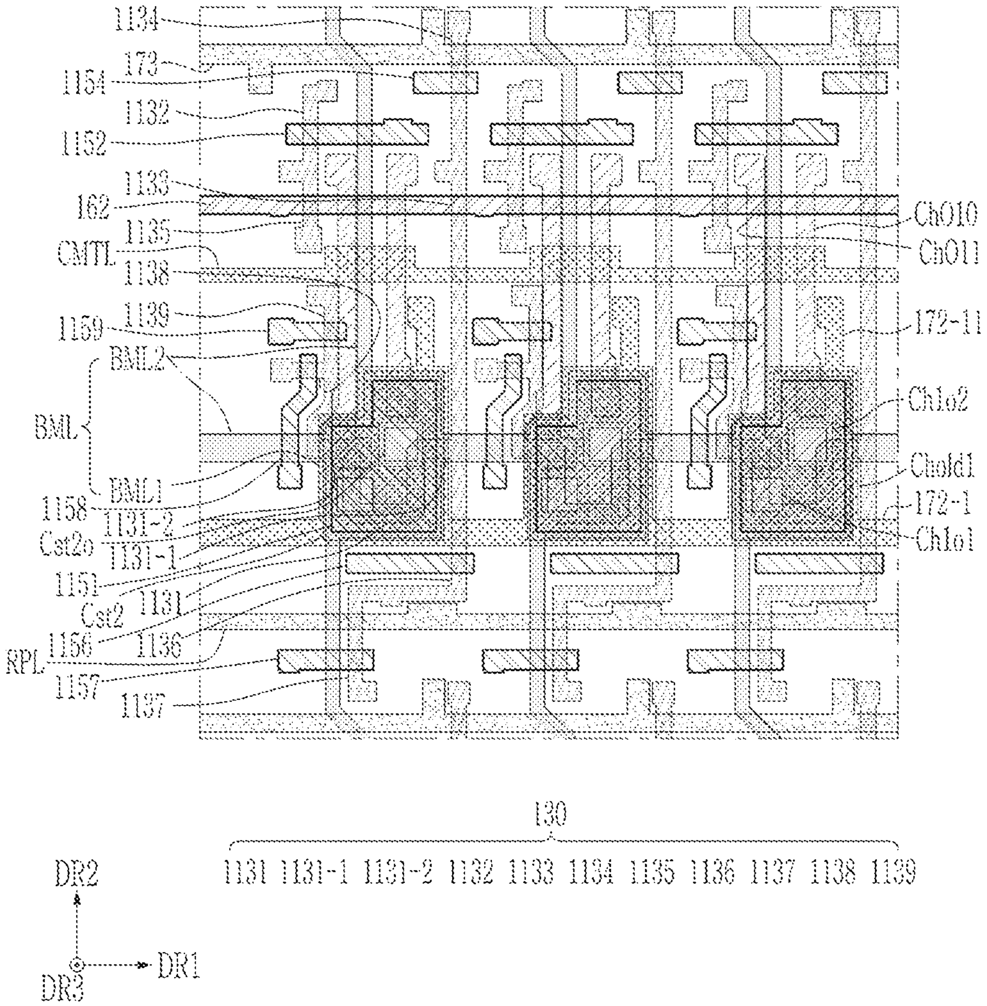

Referring to FIG. 8, an oxide semiconductor layer that includes a first oxide semiconductor ChO10 including a channel of the tenth transistor T10 and a second oxide semiconductor ChO11 including a channel of the eleventh transistor T11 is positioned on the second interlayer insulating layer 152.

The first oxide semiconductor ChO10 includes not only the channel of the tenth transistor T10 but also includes a first area and a second area that serve as a first electrode and a second electrode of the tenth transistor T10, and the second oxide semiconductor ChO11 may include not only the channel of the eleventh transistor T11 but also a first area and a second area serving as a first electrode and a second electrode of the eleventh transistor T11.

The first oxide semiconductor ChO10 and the second oxide semiconductor ChO11 are separated from each other, and each has a structure extending in the second direction DR2. In addition, the first oxide semiconductor ChO10 and the second oxide semiconductor ChO11 have a structure that partially overlaps and intersects the auxiliary electrode line CMTL positioned below on a plane.

Both ends of first oxide semiconductor ChO10 are connected to the second transistor T2 and the second storage electrode Cst2 through a subsequent process, and both ends of the second oxide semiconductor ChO11 are connected to the third transistor T3 and the driving gate electrode 1151 through a subsequent process.

Referring to FIG. 16, a third gate insulating layer 143 is positioned on the oxide semiconductor layer.

The third gate insulating layer 143 may be positioned on the entire surface of the oxide semiconductor layer and the second interlayer insulating layer 152. According to some embodiments, the third gate insulating layer 143 may not be positioned on the entire surface of the oxide semiconductor layer and the second interlayer insulating layer 152 but may be positioned only in some regions. For example, the third gate insulating layer 143 may have a structure that overlaps a channel of an oxide semiconductor layer, but does not overlap a first area and a second area positioned on both sides thereof.

The third gate insulating layer 143 may be an inorganic insulating layer including a silicon oxide ($SiO_x$), a silicon nitride ($SiN_x$), a silicon oxynitride ($SiO_xN_y$), or the like.

Figure 9:
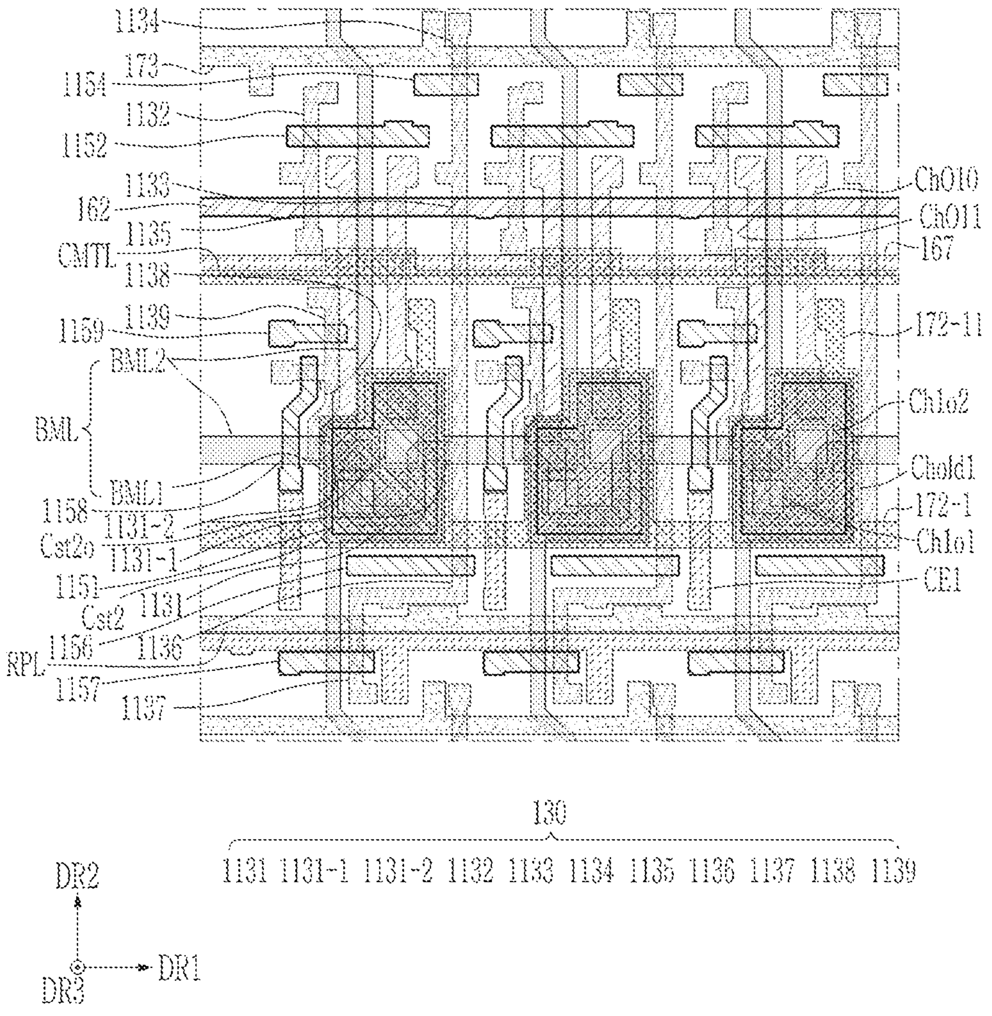

Referring to FIG. 9, a third gate conductive layer is positioned on the third gate insulating layer 143.

The third gate conductive layer includes a 2-1 scan line 167 including a gate electrode of tenth transistor T10 and a gate electrode of eleventh transistor T11, a 2-1 initialization voltage line 175-1 transmitting the second initialization voltage VAINT, and a connection electrode CE1.

The 2-1 scan line 167 extends in the first direction DR1 and has a structure that overlaps and intersects the oxide semiconductor layer (first oxide semiconductor ChO10 and second oxide semiconductor ChO11) in a plan view. The part of the first oxide semiconductor ChO10 overlapping the 2-1 scan line 167 on a plane forms the channel of the tenth transistor T10, and a part of the second oxide semiconductor ChO11 overlapping the 2-1 scan line 167 on a plane forms the channel of the eleventh transistor T11.

The 2-1 Initialization voltage line 175-1 is extended to the first direction DR1, and serves to transmit the second initialization voltage VAINT to the first direction DR1. The 2-1 initialization voltage line 175-1 has a plurality of protruding portions, and the protruding portions are connected to the seventh transistor T7 through a subsequent process.

The connection electrode CE1 extends in the second direction DR2 and electrically connects an eighth gate electrode 1158, which is the gate electrode of the adjacent eighth transistor T8, and the fourth scan line 166 through a subsequent process.

The third gate conductive layer may include a metal such as copper (Cu), molybdenum (Mo), aluminum (Al), and titanium (Ti), or a metal alloy thereof, and may be formed of a single layer or multiple layers.

After forming the third gate conductive layer, a portion of the oxide semiconductor layer covered by the third gate conductive layer is formed as a channel through a plasma treatment or doping process, and a portion of the oxide semiconductor layer not covered by the third gate conductive layer become conductive. As a result, a portion overlapping the 2-1 scan line 167 of the first oxide semiconductor ChO10 on a plane forms a channel of the tenth transistor T10, and both ends of the channel of the first oxide semiconductor ChO10 form a first area and a second area serving as a first electrode and a second electrode of the tenth transistor T10. In addition, a portion of the 2-1 scan line 167 of the second oxide semiconductor ChO11 on a plane forms a channel of the eleventh transistor T11, and both ends of the second oxide semiconductor ChO11 form a first area and a second area that serve as a first electrode and a second electrode of the eleventh transistor T11.

Referring to FIG. 16, a third interlayer insulating layer 153 is positioned on the third gate conductive layer. The third interlayer insulating layer 153 may have a single layer or multi-layered structure. The first interlayer insulating layer 151 may include an inorganic insulating layer including a silicon oxide ($SiO_x$), a silicon nitride ($SiN_x$), or a silicon oxynitride ($SiO_xN_y$), and according to some embodiments, it may include an organic material.

Figure 10:
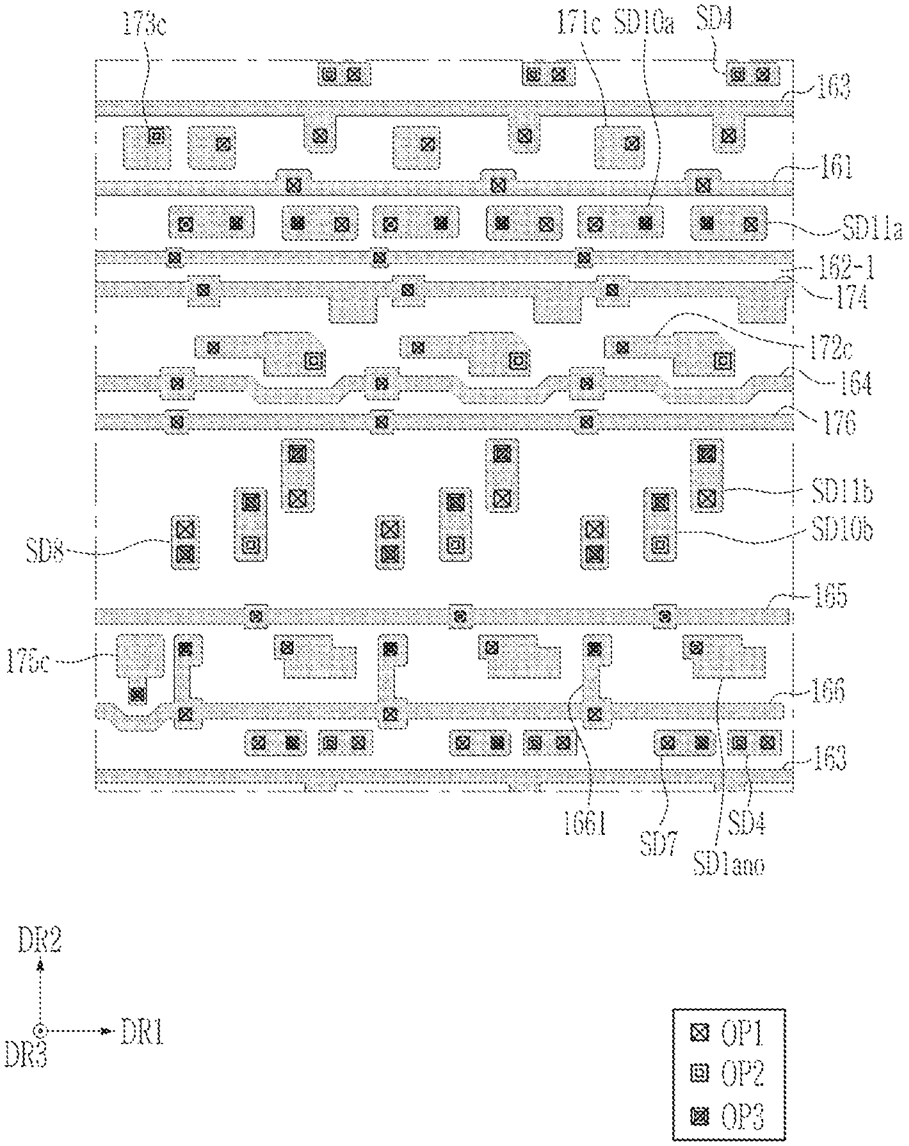
Figure 11:
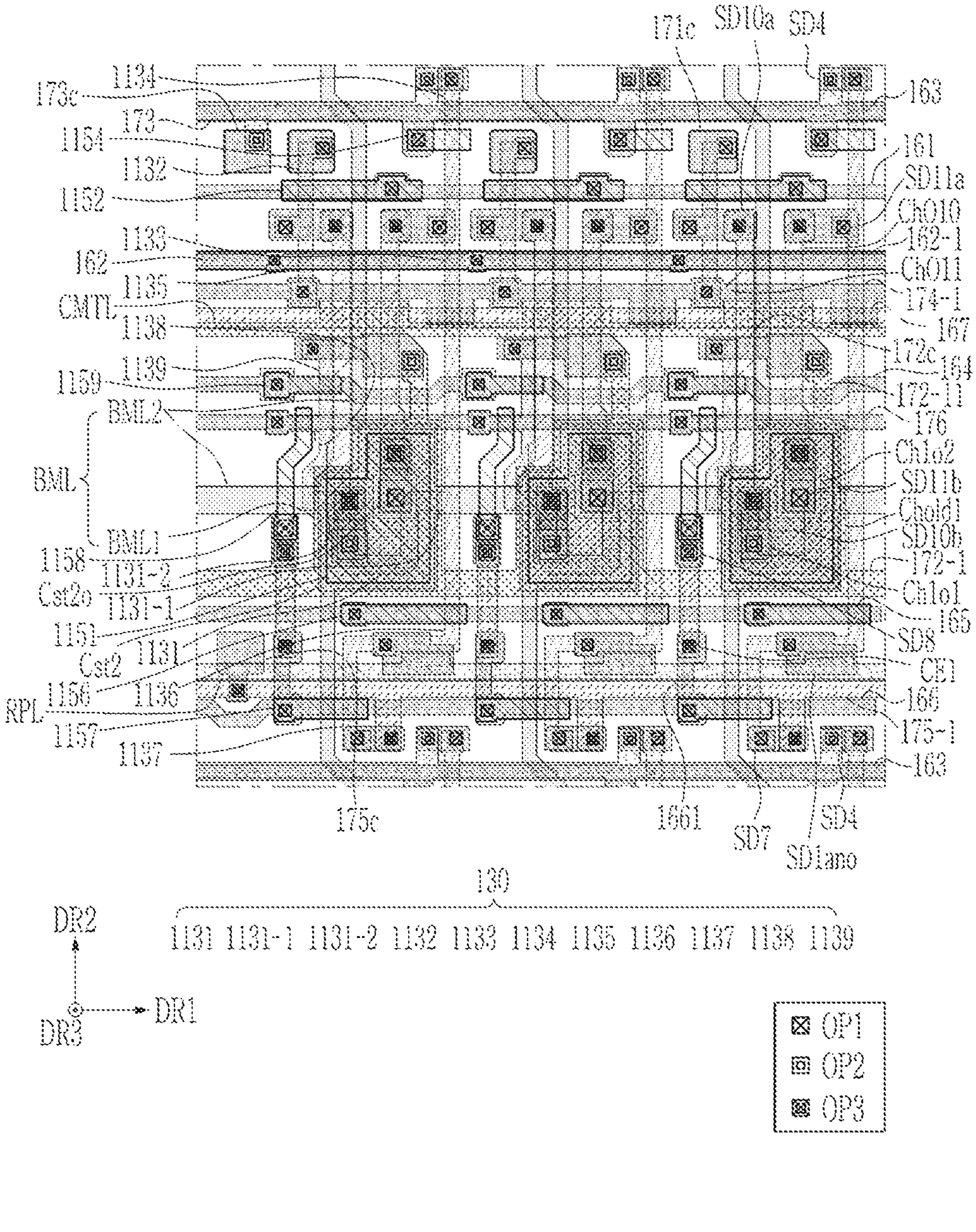

After the third interlayer insulating layer 153 is deposited, a process of forming a plurality of openings is performed. Referring to FIG. 10, a third interlayer insulating layer 153 and opening OP1, OP2, and OP3 formed on the lower insulating layer, and a first data conductive layer laminated thereafter are shown. In FIG. 11, the openings OP1, OP2, and OP3 and the first data conductive layer are illustrated in addition to FIG. 9. That is, because the first data conductive layer cannot be easily recognized in FIG. 11, FIG. 10 illustrates only the first data conductive layer through a top plan view, and FIG. 11 illustrates all the layers below the first data conductive layer through a top plan view.

The a plurality of openings OP1, OP2, and OP3 are formed in the third interlayer insulating layer 153 and insulating layers (first gate insulating layer 141, second gate insulating layer 142, first interlayer insulating layer 151, second interlayer insulating layer 152, third gate insulating layer 143) positioned therebelow. Here, a plurality of openings OP1, OP2, and OP3 may be formed using different masks.

The opening OP1 is also formed in the third interlayer insulating layer 153, the third gate insulating layer 143, the second interlayer insulating layer 152, the first interlayer insulating layer 151, and the second gate insulating layer 142, depending on the opening OP1, it may be additionally formed in the first gate insulating layer 141. As a result, opening OP1 may expose the first gate conductive layer or the first semiconductor layer 130.

The opening OP2 is formed on the third interlayer insulating layer 153, the third gate insulating layer 143, and the second interlayer insulating layer 152, and may be additionally formed on the first interlayer insulating layer 151 depending on the opening OP2. As a result, the opening OP2 may expose the second gate conductive layer or the auxiliary conductive layer.

The opening OP3 is formed on the third interlayer insulating layer 153, and may be additionally formed on the third gate insulating layer 143 depending on the opening OP3. As a result, the opening OP3 may expose the oxide semiconductor layer or the third gate conductive layer.

The first data conductive layer is formed on the third interlayer insulating layer 153 on which the plurality of openings OP1, OP2, and OP3 are formed.

Referring to FIG. 10 and FIG. 11, the first data conductive layer may include a voltage line to which a constant voltage is applied and a signal line and a connection electrode to which a signal (scan signal or light emission signal) that is changed per frame can be input.

A voltage line to which a constant voltage is applied among the first data conductive layers of FIG. 11 includes a first reference voltage line 174-1 and a bias voltage line 176.

The signal line to which a scan signal can be input for every frame among the first data conductive layer of FIG. 11 may include a first scan line 161 to which the first scan signal GW is applied, an additional second scan line 162-1 to which the second scan signal GC is additionally applied, a first light emission signal line 164 to which the first light emission signal EM1 is applied, and a fourth scan line 166 to which the fourth scan signal EB is applied.

The connection electrode of the first data conductive layer of FIG. 11 may include various connection electrodes 171*c*, 172*c*, 173*c*, 175*c*, SD4, SD7, SD8, SD10*a*, SD10*b*, SD11*a*, SD11*b*, and SD1*ano*.

First, the voltage line of the first data conductive layer will be described.

The first reference voltage line 174-1 extends to the first direction DR1 and is connected to the semiconductor 1135 through the opening OP1 to transmit the reference voltage VREF to the fifth transistor T5. The first reference voltage line 174-1 serves to transmit the reference voltage VREF to the first direction DR1.

The bias voltage line 176 extends to the first direction DR1 and is connected to the semiconductor 1138 through the opening OP1 to transmit the bias voltage Vbias to the eighth transistor T8.

Meanwhile, the signal line of the first data conductive layer will now be described.

The first scan line 161 to which the first scan signal GW is applied extends in the first direction DR1, and is connected to the second gate electrode 1152 through the opening OP1 and transmits the first scan signal GW to the gate electrodes of the second transistor T2 and the third transistor T3.

The additional second scan line 162-1 to which the second scan signal GC is additionally applied extends to the first direction DR1 and is connected to the second scan line 162 positioned on the first gate conductive layer through the opening OP1.

The third scan line 163 to which the third scan signal GI is applied extends to the first direction DR1 and is connected to the fourth gate electrode 1154 through the opening OP1.

The first light emission signal line 164 to which the first light emission signal EM1 is applied extends in the first direction DR1 and is connected with the ninth gate electrode 1159 through the opening OP1, and the second light emission signal line 165 to which the second light emission signal EM2 is applied extends in the first direction and is connected with the sixth gate electrode 1156 through the opening OP1.

The fourth scan line 166 to which the fourth scan signal EB is applied extends in the first direction DR1, and is connected with the seventh gate electrode 1157 through the opening OP1. In addition, the fourth scan line 166 includes a protruding portion 1661 protruding in the second direction DR2, and the protruding portion 1661 is connected with the eighth gate electrode 1158 such that the fourth scan signal EB is applied to the gate electrode of the eighth transistor T8.

Meanwhile, the connection electrode of the first data conductive layers will now be described.

The connection electrode 171*c* is connected to the semiconductor 1132 of the first semiconductor layer 130 through the opening OP1.

The connection electrode 172*c* is electrically connected to the semiconductor 1139 of the first semiconductor layer 130 through the opening OP1 and electrically connected to the protruding portion 172-11 of the first hold electrode Chold1 through the opening OP2. As a result, the driving voltage ELVDD is transmitted to the semiconductor 1139 of the first semiconductor layer 130.

The connection electrode 173*c* is electrically connected to the first initialization voltage line 173 through the opening OP2.

The connection electrode 175*c* is electrically connected to the 2-1 initialization voltage line 175-1 through the opening OP3.

The connection electrode SD4 is electrically connected to the semiconductor 1134 of the first semiconductor layer 130 through the opening OP1 and electrically connected to the first initialization voltage line 173 through the opening OP2. As a result, the first initialization voltage VINT is transmitted to the fourth transistor T4.

The connection electrode SD7 is electrically connected to the semiconductor 1137 of the first semiconductor layer 130 through the opening OP1 and electrically connected to the 2-1 initialization voltage line 175-1 through the opening OP3. As a result, the second initialization voltage VAINT is transmitted to the seventh transistor T7.

The connection electrode SD8 is electrically connected to the eighth gate electrode 1158 through the opening OP1 and electrically connected to the connection electrode CE1 through the opening OP3. As a result, the connection electrode SD8 serves to electrically connect the eighth gate electrode 1158 with the fourth scan line 166.

The connection electrode SD10*a* is connected with the first oxide semiconductor ChO10 through the opening OP3, and is connected to the semiconductor 1132 of the first semiconductor layer 130 through the opening OP1. As a result, the tenth transistor T10 and the second transistor T2 are electrically connected.

The connection electrode SD10*b* connects the opening OP3 to the first oxide semiconductor ChO10, and connects the second storage electrode Cst2 through the opening OP2 and the first opening Ch1*o*1 of the first hold electrode Chold1. As a result, the tenth transistor T10 and the second storage electrode Cst2 are electrically connected.

The connection electrode SD11*a* is connected to the second oxide semiconductor ChO11 through the opening OP3 and connected to the semiconductor 1133 of the first semiconductor layer 130 through the opening OP1. As a result, the eleventh transistor T11 and the third transistor T3 are electrically connected.

The connection electrode SD11*b* is connected with the second oxide semiconductor ChO11 through the opening OP3, and is connected to the driving gate electrode 1151 through the opening OP1, the opening Cst2*o* of the second storage electrode Cst2, and the second opening Ch1*o*2 of the first hold electrode Chold1. As a result, the tenth transistor T10 and the driving gate electrode 1151 are electrically connected.

The connection electrode SD1*ano* is connected to the semiconductor 1136 of the first semiconductor layer 130 through the opening OP1. An output current of the driving transistor T1 passed through the sixth transistor T6 is applied to the connection electrode SD1*ano*.

The first data conductive layer may include a metal such as copper (Cu), molybdenum (Mo), aluminum (Al), and titanium (Ti), or a metal alloy thereof, and may be formed of a single layer or multiple layers.

Referring to FIG. 16, the first organic layer 181 is positioned on the first data conductive layer. The first organic layer 181 may be an organic insulator including an organic material, and the organic material may include at least one material selected from a group consisting of polyimide, polyamide, acryl resin, benzocyclobutene, and phenol resin.

Figure 12:
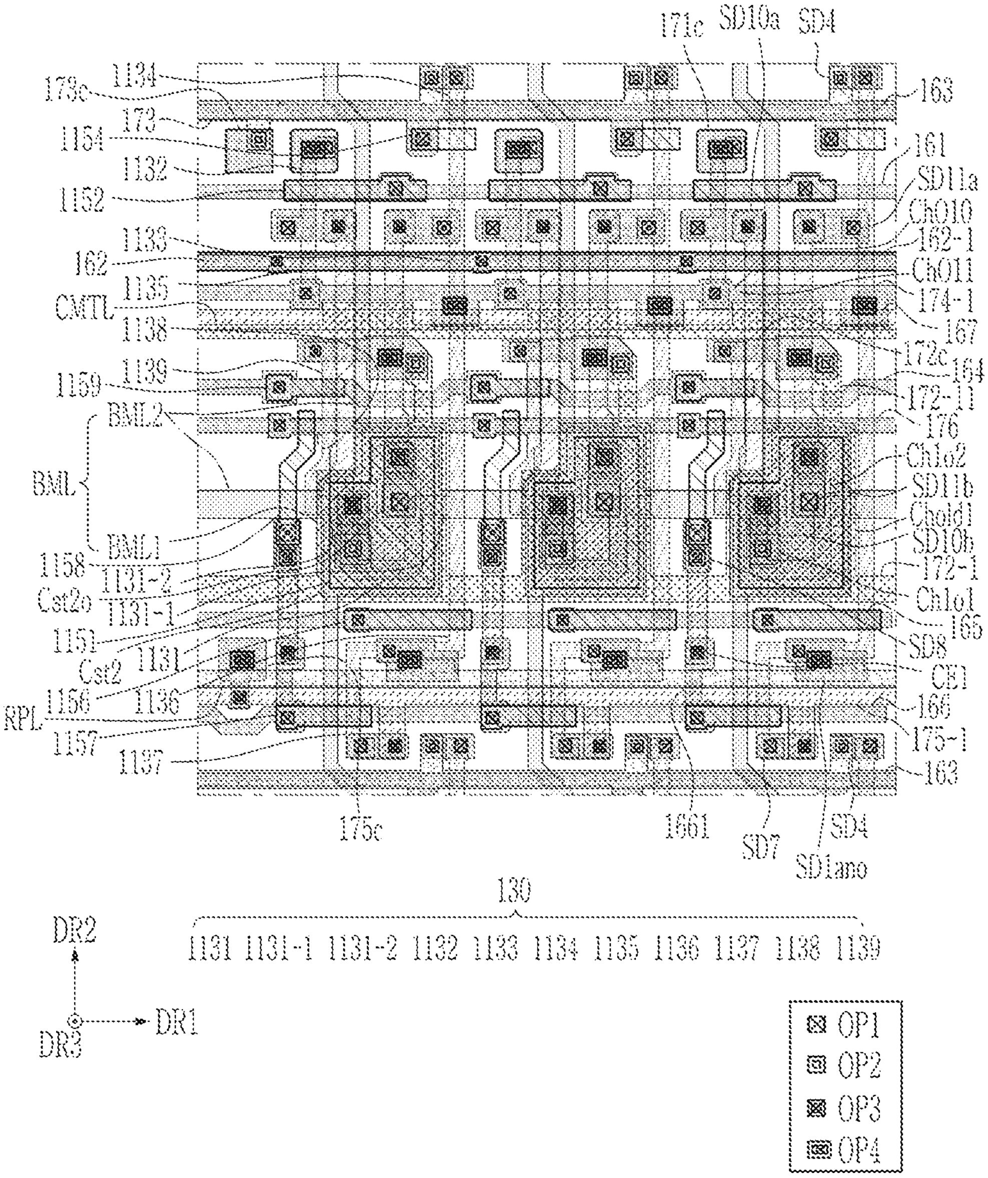

Referring to FIG. 12, an opening OP4 is positioned on the first organic layer 181. The opening OP4 exposes the first data conductive layer and connects the first data conductive layer to the second data conductive layer.

Figure 13:
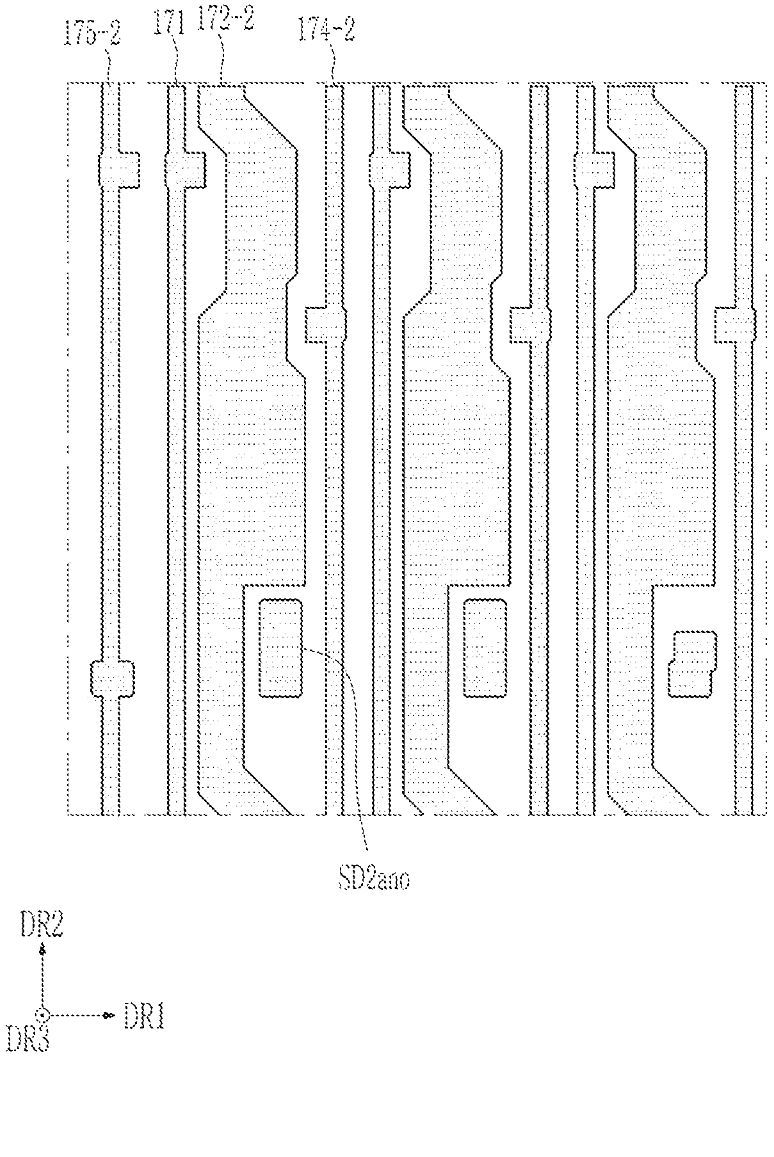
Figure 14:
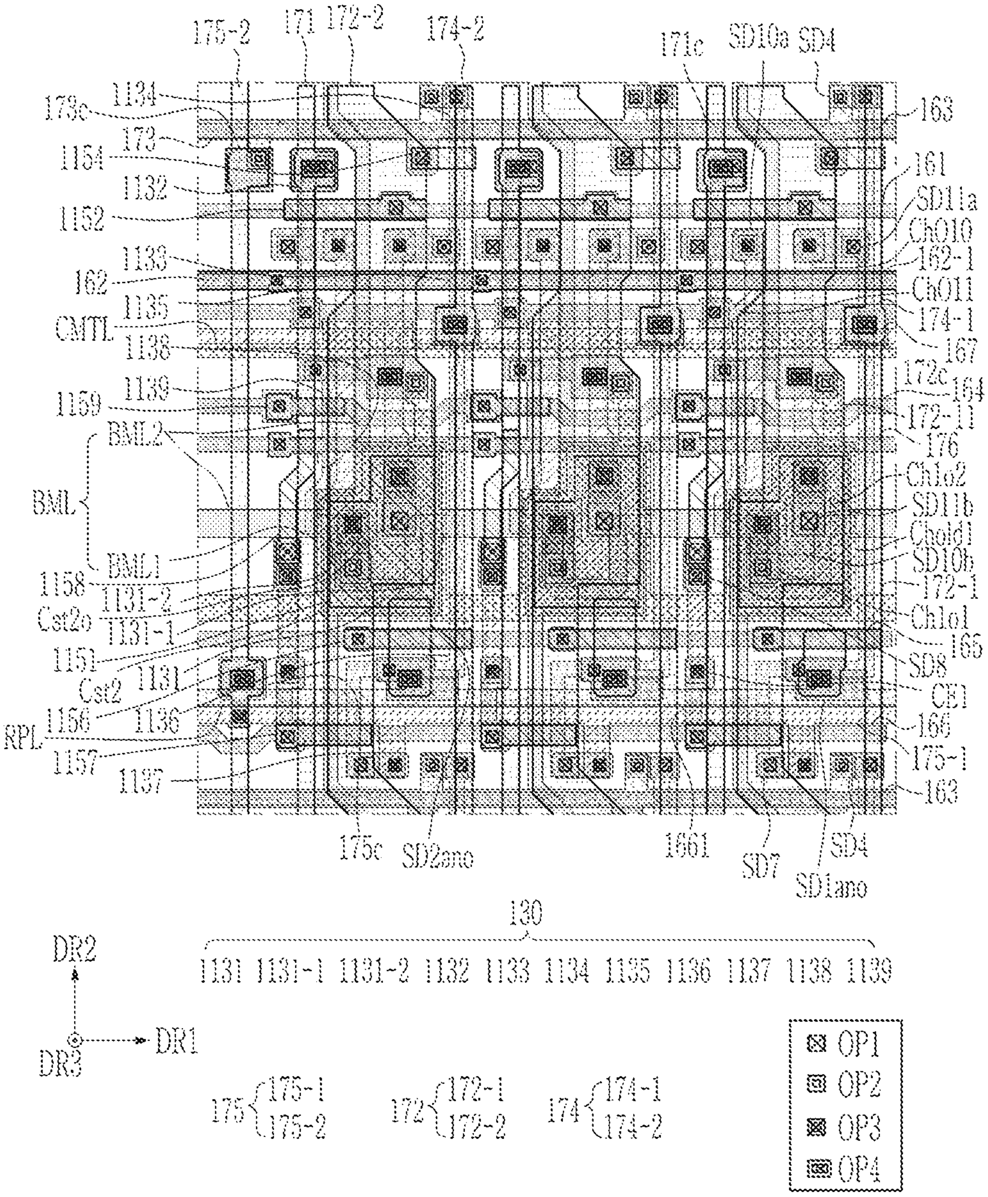

Referring to FIG. 13 and FIG. 14, the second data conductive layer is positioned on the first organic layer 181.

FIG. 13 shows only the second data conductive layer laminated on the first organic layer 181 because it may be difficult to easily recognize the second data conductive layer in FIG. 14. Meanwhile, in FIG. 14, all the layers below the second data conductive layer are illustrated.

The second data conductive layer may include the data line 171 to which the data voltage VDATA is applied, a second driving voltage line 172-2 to which the driving voltage ELVDD is transmitted, a second reference voltage line 174-2 to which the reference voltage VREF is transmitted, a 2-2 initialization voltage line 175-2, and an anode connection electrode SD2*ano*.

The data line 171 extends in the second direction DR2 and is connected to the connection electrode 171*c* through the opening OP4. Because the connection electrode 171*c* is connected to the semiconductor 1132 of the first semiconductor layer 130 through the opening OP1, the data voltage VDATA passes through the connection electrode 171*c* and is transmitted to the first electrode of the second transistor T2.

The second driving voltage line 172-2 extends to the second direction DR2 and is connected to the connection electrode 172*c* through the opening OP4. In addition, because the connection electrode 172*c* is connected to the semiconductor 1139 of the first semiconductor layer 130 and the protruding portion 172-11 of the first hold electrode Chold1 through the opening OP1 and OP2, the driving voltage ELVDD is transmitted in the direction DR2 through the second driving voltage line 172-2 and is also transmitted to the first direction DR1 through the first driving voltage line 172-1. Due to the driving voltage line 172 having such a mesh structure, the driving voltage ELVDD may have a constant voltage value throughout the light emitting display device.

The second reference voltage line 174-2 extends in the second direction DR2, and is connected to the first reference voltage line 174-1 through the opening OP4, and the first reference voltage line 174-1 is connected to the semiconductor 1135 of the fifth transistor T5 through the opening OP1. According to such a structure, the reference voltage VREF is transmitted in the second direction through the second reference voltage line 174-2 and also transmitted in the first direction through the first reference voltage line 174-1. Due to the reference voltage line 174 having such a mesh structure, the reference voltage VREF may have a constant voltage value throughout the light emitting display device.

The 2-2 initialization voltage line 175-2 is extended in the second direction DR2 and connected to the connection electrode 175*c* through the opening OP4, and the connection electrode 175*c* is connected to the 2-1 initialization voltage line 175-1 through the opening OP3. According to such a structure, the second initialization voltage VAINT is transmitted in the second direction through the 2-2 initialization voltage line 175-2 and also transmitted in the first direction through the 2-1 initialization voltage line 175-1. Due to the second initialization voltage line 175 having such a mesh structure, the second initialization voltage VAINT may have a constant voltage value throughout the light emitting display device.

On the other hand, an additional initialization voltage line extending in the second direction DR2 may be positioned instead of the 2-2 initialization voltage line 175-2 at a position where the 2-2 initialization voltage line 175-2 is positioned. The additional initialization voltage line may be connected to the connection electrode 173*c* through the opening OP4, and the connection electrode 173*c* may be connected to the first initialization voltage line 173 through the opening OP2. According to such a structure, the first initialization voltage VINT is transmitted in the second direction through the additional initialization voltage line and also transmitted in the first direction through the first initialization voltage line 173. Due to the first initialization voltage line having such a mesh structure, the first initialization voltage VINT can have a constant voltage value throughout the light emitting display device.

The anode connection electrode SD2*ano* is connected to the connection electrode SD1*ano* through the opening OP4 and connected to the semiconductor 1136 of the first semiconductor layer 130 through the opening OP1. As a result, the output current of the driving transistor T1 passed through the sixth transistor T6 is transmitted to the anode of the light emitting diode LED through the connection electrode SD1*ano* and the anode connection electrode SD2*ano*.

The second data conductive layer may include a metal such as copper (Cu), molybdenum (Mo), aluminum (Al), and titanium (Ti), or a metal alloy thereof, and may be formed of a single layer or multiple layers.

Figure 15:
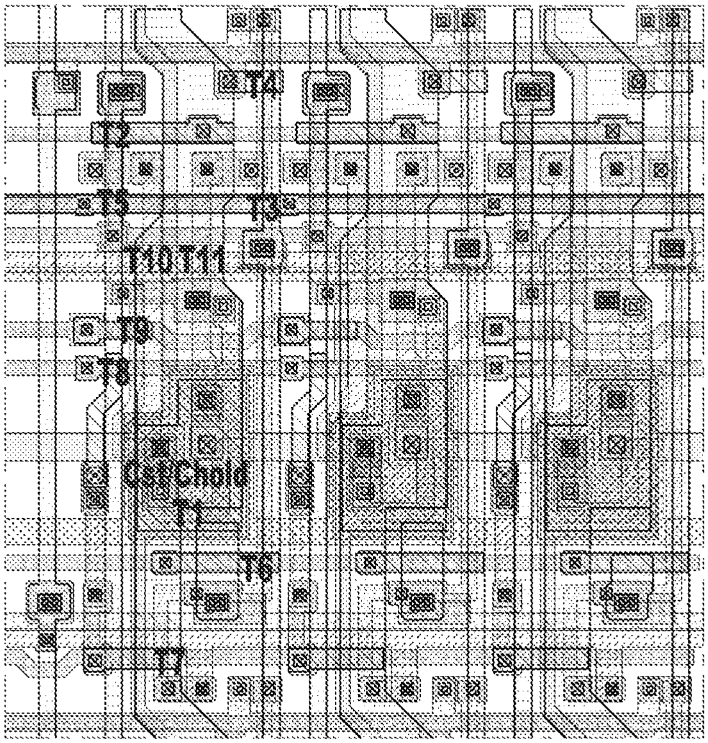
Figure 15:
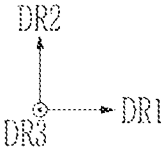

Meanwhile, in FIG. 15, the position of each element (transistor and capacitor) in the pixel is shown in bold letters such that it can be more clearly identified.

FIG. 3 to FIG. 15 shows a planar structure up to the pixel circuit portion, but referring to FIG. 16, the second organic layer 182 is positioned on the second data conductive layer. Various layers such as the light emitting diode LED and the encapsulation layer may be positioned on the second organic layer 182, and this will be described in detail with reference to FIG. 16.

FIG. 16 is a cross-sectional view of a light emitting display device according to some embodiments.

Referring to FIG. 16, an overlapping electrode BML is positioned on a substrate 110.

The substrate 110 may include a material that has rigid characteristics such as glass and does not bend, or may include a flexible material that can bend, such as plastic or polyimide. In the case of a flexible substrate, a double-layer structure of polyimide and a barrier layer formed of an inorganic insulating material thereon may have a double structure.

The overlapping electrode BML may be formed at a position overlapping in a plane with a channel of a driving transistor T1 among the subsequent first semiconductor layers 130, and is also referred to as a lower shielding layer. The overlapping electrode BML may include a metal such as copper (Cu), molybdenum (Mo), aluminum (Al), and titanium (Ti), or a metal alloy thereof.

A buffer layer 111 covering the substrate 110 and the overlapping electrode BML are positioned thereon. The buffer layer 111 serves to block the penetration of impurity elements into the first semiconductor layer 130, and may be an inorganic insulating layer including a silicon oxide (SiOx), a silicon nitride (SiNx), a silicon oxynitride (SiOxNy), or the like.

A first semiconductor layer 130 formed of silicon semiconductor (e.g. polycrystalline semiconductor) is positioned on the buffer layer 111. The first semiconductor layer 130 includes a channel, a first area, and a second area positioned on both sides of the channel of a polycrystalline transistor LTPS TFT including the driving transistor T1. Here, the polycrystalline transistor LTPS TFT may include a second transistor T2, a third transistor T3, a fourth transistor T4, a fifth transistor T5, a sixth transistor T6, a seventh transistor T7, an eighth transistor T8, and a ninth transistor T9 as well as the driving transistor T1. In addition, both sides of the channel of the first semiconductor layer 130 have a region having a conductive layer characteristic by plasma treatment or doping, and thus they can serve as a first electrode and a second electrode of the transistor.

A first gate insulating layer 141 may be positioned on the first semiconductor layer 130. The first gate insulating layer 141 may be an inorganic insulating layer including a silicon oxide (SiOx), a silicon nitride (SiNx), a silicon oxynitride (SiOxNy), or the like.

A first gate conductive layer including a gate electrode of a polycrystalline transistor LTPS TFT may be positioned on the first gate insulating layer 141. The first gate conductive layer includes the driving gate electrode 1151 of the driving transistor T1. The first gate conductive layer may include a metal such as copper (Cu), molybdenum (Mo), aluminum (Al), and titanium (Ti), or a metal alloy thereof, and may be formed of a single layer or multiple layers.

After forming the first gate conductive layer, a plasma treatment or doping process may be performed such that the exposed area of the first semiconductor layer 130 can be conductive. That is, the first semiconductor layer 130 covered by the first gate conductive layer is not conductive, and a portion of the first semiconductor layer 130 not covered by the first gate conductive layer may have the same characteristics as the conductive layer.

A second gate insulating layer 142 may be positioned on the first gate conductive layer and first gate insulating layer 141. The second gate insulating layer 142 may be an inorganic insulating layer including a silicon oxide (SiOx), a silicon nitride (SiNx), a silicon oxynitride (SiOxNy), or the like.

A second gate conductive layer including a second storage electrode Cst2 of a storage capacitor Cst may be positioned on the second gate insulating layer 142. The second gate conductive layer may include a metal such as copper (Cu), molybdenum (Mo), aluminum (Al), and titanium (Ti), or a metal alloy thereof, and may be formed of a single layer or multiple layers.

A first interlayer insulating layer 151 may be positioned on the second gate conductive layer. The first interlayer insulating layer 151 may include an inorganic insulating layer including a silicon oxide ($SiO_x$), a silicon nitride ($SiN_x$), a silicon oxynitride ($SiO_xN_y$), and according to some embodiments, an inorganic insulating material may be formed thickly or an organic material may be included.

An auxiliary electrode layer including a first hold electrode Chold1 of a hold capacitor Chold is positioned on the first interlayer insulating layer 151. The auxiliary electrode layer also includes an overlapping auxiliary electrode line CMTL positioned below the oxide transistor oxide TFT, and the characteristic of the oxide transistor oxide TFT is changed according to a voltage applied to the auxiliary electrode line CMTL, and thus this will be described in detail with reference to FIG. 17 to FIG. 23. The auxiliary electrode layer may include a metal such as copper (Cu), molybdenum (Mo), aluminum (Al), and titanium (Ti), or a metal alloy thereof, and may be composed of a single layer or multiple layers.

A second interlayer insulating layer 152 may be positioned on the auxiliary electrode layer. The first interlayer insulating layer 151 may include an inorganic insulating layer including a silicon oxide ($SiO_x$), a silicon nitride ($SiN_x$), a silicon oxynitride ($SiO_xN_y$), and according to some embodiments, an inorganic insulating material may be formed thickly.

An oxide semiconductor layer including a channel, a first area, and a second area of the oxide transistor oxide TFT and including a first oxide semiconductor ChO10 of a tenth transistor T10 may be positioned on the second interlayer insulating layer 152.

A third gate insulating layer 143 may be positioned on the oxide semiconductor layer. The third gate insulating layer 143 may be positioned on the entire surface of the oxide semiconductor layer and the second interlayer insulating layer 152. The third gate insulating layer 143 may include an inorganic insulating layer including a silicon oxide ($SiO_x$), a silicon nitride ($SiN_x$), or a silicon oxynitride ($SiO_xN_y$).

A third gate conductive layer including a 2-1 scan line 167 including a gate electrode of the oxide transistor may be positioned on the third gate insulating layer 143. A gate electrode of the oxide transistor may overlap the channel. The third gate conductive layer may include a metal such as copper (Cu), molybdenum (Mo), aluminum (Al), and titanium (Ti), or a metal alloy thereof, and may be formed of a single layer or multiple layers.

After forming the third gate conductive layer, an exposed region of the oxide transistor may be conductive by performing a plasma treatment or doping process. That is, the oxide transistor covered by the third gate conductive layer is not conductive, and a portion of the oxide transistor not covered by the third gate conductive layer may have the same characteristics as the conductive layer.

A third interlayer insulating layer 153 may be positioned on the third gate conductive layer. The third interlayer insulating layer 153 may have a single layer or multi-layered structure. The third interlayer insulating layer 153 may include an inorganic insulating layer including a silicon oxide ($SiO_x$), a silicon nitride ($SiN_x$), a silicon oxynitride ($SiO_xN_y$), and according to some embodiments, an organic material may be included.

A first data conductive layer including a plurality of connection electrodes that may be connected to the first area and the second area of each of the polycrystalline transistor LTPS TFT and the oxide transistor oxide TFT may be positioned on the third interlayer insulating layer 153. Among the plurality of connection electrodes positioned in the first data conductive layer, a connection electrode SD1*ano* is illustrated in FIG. 16. The first data conductive layer may include a metal such as copper (Cu), molybdenum (Mo), aluminum (Al), and titanium (Ti), or a metal alloy thereof, and may be formed of a single layer or multiple layers.

A first organic layer 181 may be positioned on the first data conductive layer. The first organic layer 181 may be an organic insulator including an organic material, and the organic material may include at least one material selected from a group consisting of polyimide, polyamide, acryl resin, benzocyclobutene, and phenol resin.

A second data conductive layer including an anode connection electrode SD2*ano* may be positioned on the first organic layer 181. The second data conductive layer may include a data line or a driving voltage line. The second data conductive layer may include a metal such as copper (Cu), molybdenum (Mo), aluminum (Al), and titanium (Ti), or a metal alloy thereof, and may be formed of a single layer or multiple layers.

A second organic layer 182 is positioned on the second data conductive layer, and an opening is formed in the second organic layer 182 such that the anode connection electrode SD2*ano* and an anode Anode are electrically connected. The second organic layer 182 may include at least one material selected from a group consisting of polyimide, polyamide, acryl resin, benzocyclobutene, and phenol resin.

The anode Anode forming a light emitting diode (LED) is positioned on the second organic layer 182. The anode Anode may be formed of a single layer including a transparent conductive oxide film or a metal material or a multi-layer including them.

The transparent conductive oxide layer may include an indium tin oxide (ITO), a poly-ITO, an indium zinc oxide (IZO), an indium gallium zinc oxide (IGZO), and an indium tin zinc oxide (ITZO). The metal material may include silver (Ag), molybdenum (Mo), copper (Cu), gold (Au), and aluminum (Al).

A pixel defining layer 380 covering at least a part of the anode Anode while having an opening OP exposing the anode Anode may be positioned on the anode Anode. The pixel defining layer 380 may be a black pixel defining layer that is formed of a black organic material to prevent or reduce externally applied light from being reflected back to the outside, and may be formed of a transparent organic material according to some embodiments. A spacer may be positioned on the pixel defining layer 380, and the spacer may be formed of the same material as the pixel defining layer 380.

A function layer FL and a cathode Cathode are sequentially formed on the anode Anode and the pixel defining layer 380, and the function layer FL and cathode Cathode may be positioned in the entire region in the display area. The emission layer EML is positioned between the function layer FL, and the emission layer EML can only be positioned within an opening OP of the pixel defining layer 380. Hereinafter, the combination of the function layer FL and the emission layer EML may be referred to as an intermediate layer. The function layer FL may include at least one of auxiliary layers such as an electron injection layer, an electron transport layer, a hole transport layer, or a hole injection layer, and the hole injection layer and the hole transport layer are positioned below the emission layer EML and the electron transport layer and electron injection layer may be positioned on the emission layer EML.

An encapsulation layer 400 is positioned on the cathode Cathode. The encapsulation layer 400 includes at least one inorganic film and at least one organic layer, and may have a three-layer structure including a first inorganic encapsulation layer, an organic encapsulation layer, and a second inorganic encapsulation layer, according to some embodiments. The encapsulation layer 400 may be for protecting the emission layer EML from moisture or oxygen that may inflow from the outside. According to some embodiments, the encapsulation layer 400 may include a structure in which an inorganic layer and an organic layer are sequentially stacked.

According to some embodiments, a sensing insulating layer and a plurality of sensing electrodes may be positioned on the encapsulation layer 400 for touch sensing.

In addition, a light blocking layer and color filter layer may be positioned on the encapsulation layer 400. According to some embodiments, a color conversion layer may be formed instead of a color filter layer. The color conversion layer may include quantum dots.

Hereinabove, the structure of the overall emissive display device and pixel has been described in detail.

Hereinafter, referring to FIG. 17 to FIG. 23, the characteristic change of the oxide transistor and the structure of the auxiliary electrode due to the auxiliary electrode overlapping with the oxide transistor will be described in detail. In the following FIG. 17 to FIG. 23, the oxide transistor is described based on the tenth transistor T10, and the eleventh transistor T11 also has the same structure and may have the same similar characteristic change.

First, referring to FIG. 17, embodiments in which a direct current (DC) voltage VB1 is applied to an auxiliary electrode of an oxide transistor will be described.

Figure 17:
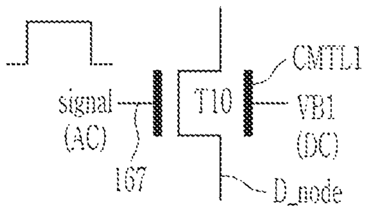
FIG. 17 shows a circuit structure of a tenth transistor including an oxide semiconductor included in a pixel according to some embodiments.

FIG. 17 shows a circuit structure of a tenth transistor including an oxide semiconductor included in a pixel according to some embodiments.

Referring to FIG. 17, a circuit structure of the tenth transistor T10, which is an oxide transistor, and a first auxiliary electrode CMTL1 overlapping at least a part (for example, a channel) of the oxide semiconductor layer of the tenth transistor T10 are shown. In FIG. 17, in order to clearly distinguish which second electrode of the tenth transistor T10 is, the data node D_node is also marked, and the 2-1 scan line 167 connected to the gate electrode is also clearly shown. In addition, FIG. 17 shows that a signal applied to the 2-1 scan line 167 connected to the gate electrode of the tenth transistor T10 is a signal of which a voltage level is changed, such as AC. In addition, in FIG. 17, it is also shown that the DC voltage VB1 is applied as a signal applied to the first auxiliary electrode CMTL1.

As such, embodiments of the overall connection structure of the first auxiliary electrode CMTL1 overlapping with the tenth transistor T10 of each pixel will be described in more detail with reference to FIG. 18.

Figure 18:
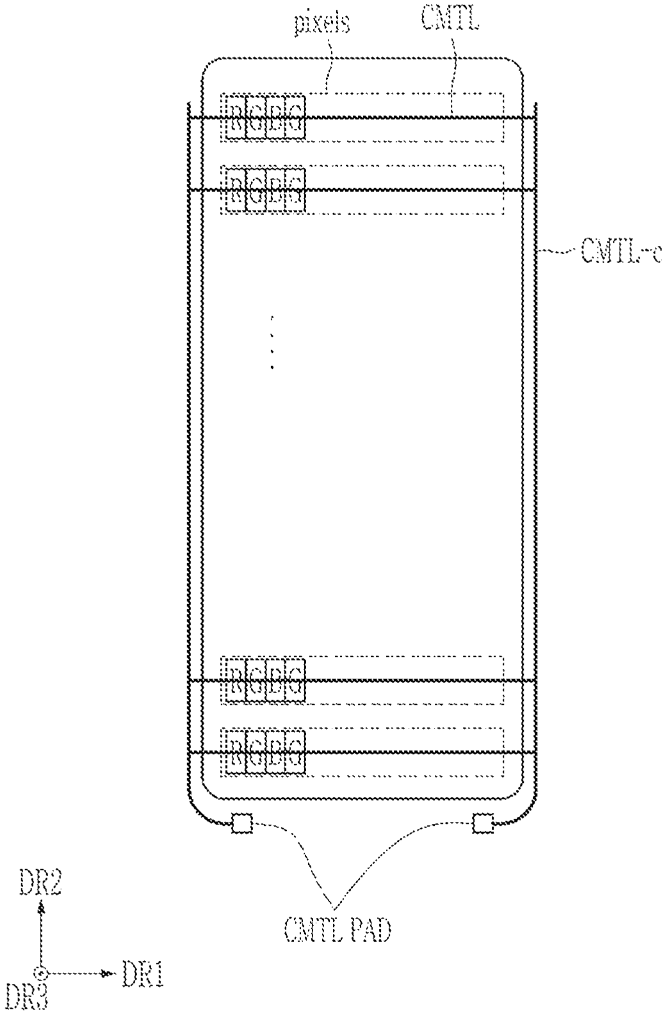
FIG. 18 shows the entire connection structure of the auxiliary electrode in the light emitting display device according to some embodiments.

FIG. 18 shows the entire connection structure of the auxiliary electrode in the light emitting display device according to some embodiments.

The auxiliary electrode line CMTL includes the first auxiliary electrode CMTL1 shown in FIG. 17, and is formed in a single wiring structure extending in a first direction DR1. As a result, the first auxiliary electrode CMTL1 overlapping with the tenth transistor T10 of each pixel can be integrally formed with the first auxiliary electrode CMTL1 of the adjacent pixel. In addition, a second auxiliary electrode CMTL2 overlapping with another oxide semiconductor eleventh transistor T11 is also connected to the first auxiliary electrode CMTL1 and the second auxiliary electrode CMTL2 of the adjacent pixel such that a single wiring structure is formed.

As shown in FIG. 18, the entire structure of the auxiliary electrode line CMTL further includes a connection portion CMTL-c and a pad portion CMTL PAD in addition to the auxiliary electrode line CMTL having one wiring structure extended to the first direction DR1.

On the outside of the display area, that is, in a part where pixels (pixels) are not positioned, both ends of the auxiliary electrode line CMTL are connected to a pair of connection portions CMTL-c extending in the second direction DR2. The connection portion CMTL-c connects a plurality of auxiliary electrode line CMTL, and a pad portion CMTL PAD is positioned at an end of the connection portion CMTL-c. A DC voltage is applied to the pad portion CMTL PAD and the corresponding voltage is transmitted to the auxiliary electrode line CMTL.

The characteristic change of the oxide transistor due to the auxiliary electrode will be described with reference to FIG. 19 and FIG. 20.

Figure 19:
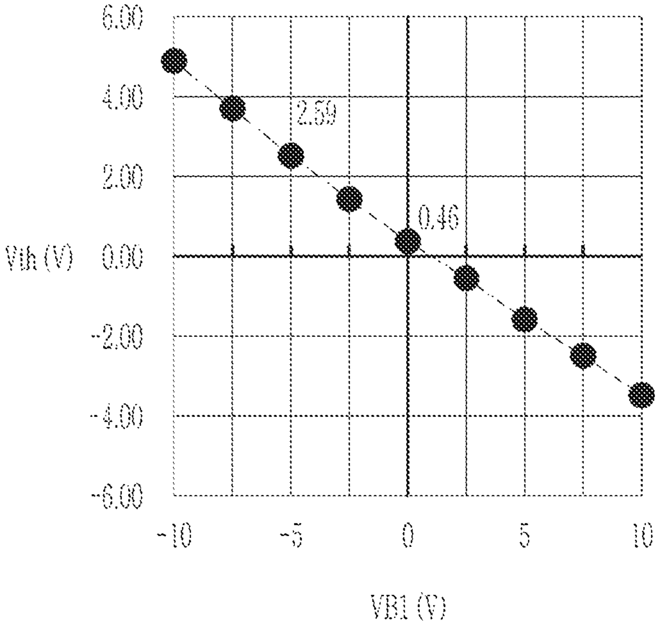
FIG. 19 shows the characteristics of the transistor including the oxide semiconductor according to some embodiments.

FIG. 19 shows the characteristics of the transistor including the oxide semiconductor.

In FIG. 19, the x-axis represents a value of the DC voltage VB1 of the signal applied to the first auxiliary electrode CMTL1, and the y-axis represents a value of a threshold voltage Vth of the tenth transistor T10, which is an oxide transistor overlapping the first auxiliary electrode CMTL1.

As can be determined in FIG. 19, as a high DC voltage is applied to the auxiliary electrode overlapping the oxide transistor, the threshold voltage Vth of the oxide transistor gradually decreases.

As described, the voltage value transmitted through the oxide transistor can be changed by adjusting the voltage applied to the auxiliary electrode overlapping the oxide transistor, and this will be described with reference to FIG. 20.

Figure 20:
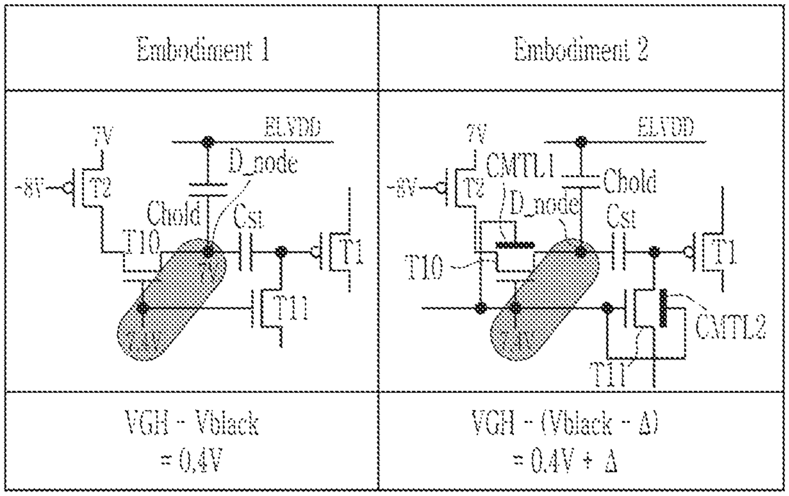
FIG. 20 shows comparison of the characteristics of tenth transistors according to some embodiments.

FIG. 20 shows comparison of the characteristics of tenth transistors according to some embodiments.

The circuit diagram shown in FIG. 20 shows only a part of the entire pixel circuit diagram.

In FIG. 20, Embodiment 1 illustrates embodiments in which the tenth transistor T10 and the eleventh transistor T11, which are oxide transistors, do not include an auxiliary electrode overlapping them, respectively, and Embodiment 2 illustrates embodiments in which the tenth transistor T10 and the eleventh transistor T11, which are oxide transistors, include auxiliary electrodes CMTL1 and CMTL2 overlapping them.

Referring to Embodiment 1 and Embodiment 2 of FIG. 20, a voltage value Vblack of a black data voltage, which is the data voltage VDATA displaying black, is 7 V, a voltage value of the gate-on voltage of the first scan signal GW applied to the gate electrode of the second transistor T2 is −8 V, a voltage value VGH of the gate-on voltage of the 2-1 scan signal GC2 applied to the gate electrodes of tenth transistor T10 and the eleventh transistor T11, which are oxide transistors, is 7.4 V.

Referring to Embodiment 1, the black data voltage passes through the second transistor T2 and the tenth transistor T10 and is transmitted to the data node D_node, and the voltage value of the data node D_node becomes 7 V, which is the voltage value Vblack of the black data voltage.

As a result, in Embodiment 1, a voltage difference between the gate electrode and the second electrode of the tenth transistor T10 is a value obtained by subtracting the voltage value Vblack of the black data voltage from the voltage value VGH of the gate-on voltage applied to the gate electrode, and it has a value of 0.4 V as shown in FIG. 20.

In Embodiment 2, unlike Embodiment 1, a DC voltage at which the threshold voltage Vth of oxide transistor (tenth transistor T10 and eleventh transistor T11) becomes relatively high that is, a relatively low DC voltage in FIG. 19 is applied as the DC voltage VB1 in auxiliary electrodes CMTL1 and CMTL2. Referring to FIG. 19, the threshold voltage of the tenth transistor T10 is increased due to the relatively low DC voltage VB1, and as a result, the voltage difference between the gate electrode and the second electrode of the tenth transistor T10 increases by A as shown in FIG. 20. That is, when the threshold voltage of the tenth transistor T10 increases, the voltage difference between the gate electrode and the second electrode, which is a voltage for turning on the tenth transistor T10, should increase. Because the voltage value VGH of the gate-on voltage applied to the gate electrode of the tenth transistor T10 is fixed at 7.4 V, the voltage value of the second electrode of the tenth transistor T10 is lowered. When the black data voltage is applied, the voltage value of the second electrode of the tenth transistor T10 becomes Vblack-A, and thus the voltage difference between the gate electrode and the second electrode of the tenth transistor T10 of Embodiment 1 has a higher voltage value by A compared to Embodiment 1 as shown in FIG. 20.

As such, because the voltage difference between the gate electrode and the second electrode of the tenth transistor T10 in Embodiment 2 is high, an electric field formed in the channel increases, and as a result, a relatively large amount of charge can be transmitted in a short time, and the charging amount for charging the storage capacitor Cst also increases in a short time.

Therefore, compared to Embodiment 1, Embodiment 2 has the merit of not deteriorating as it can control the amount of charge such that it is not insufficient even when the data voltage must be transmitted to the storage capacitor Cst in a short time, such as in high-speed driving.

Hereinafter, an example variation of FIG. 18 will be described in more detail with reference to FIG. 21.

Figure 21:
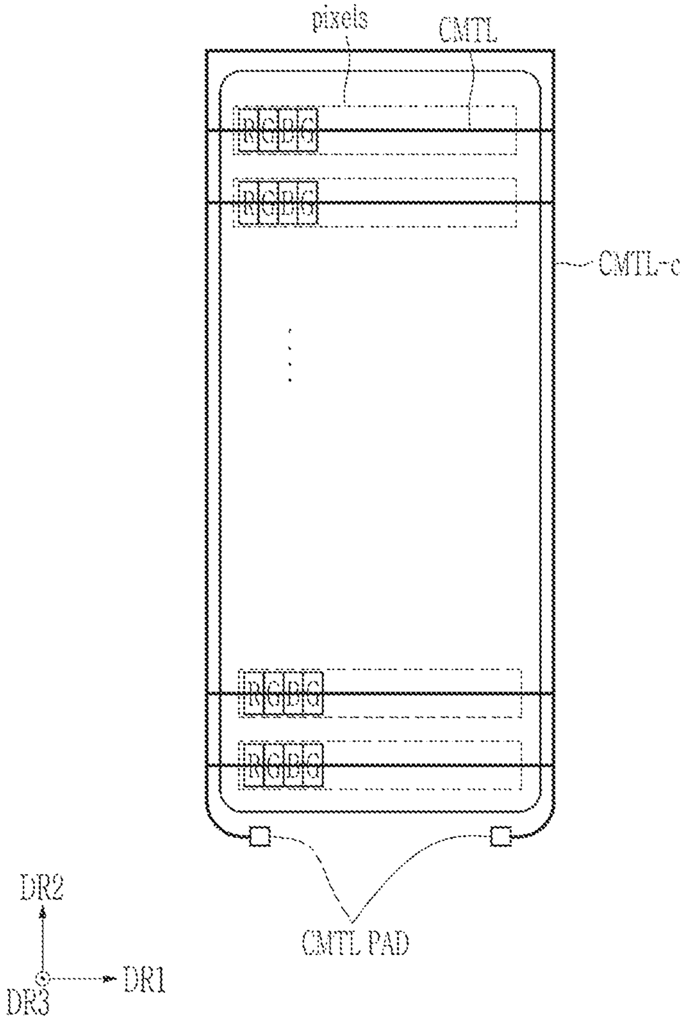
FIG. 21 shows the entire connection structure of an auxiliary electrode in a light emitting display device according to some embodiments.

FIG. 21 shows the entire connection structure of an auxiliary electrode in a light emitting display device according to some embodiments.

FIG. 21 is a figure corresponding to FIG. 18, and as shown in FIG. 17, another connection structure of the entire auxiliary electrode when the DV voltage VB1 is applied to the first auxiliary electrode CMTL is illustrated.

However, not as in FIG. 18, in FIG. 21, outside of the display area, that is, in a portion where pixels are not positioned, a pair of connection portion CMTL-c extends to the first direction DR1 and has a structure connected to each other.

In the above, the embodiments in which the DC voltage having the same voltage value is applied to all auxiliary electrode line CMTL has been described.

According to some embodiments, different DC voltages may be applied while adjacent auxiliary electrode lines CMTL are separated from each other.

Meanwhile, hereinafter, referring to FIG. 22 and FIG. 23, embodiments in which a signal of which a voltage level is changed, such as AC, is applied to the first auxiliary electrode CMTL1 will be described.

First, referring to FIG. 22, embodiments in which a voltage VB2 of which a voltage level changes is applied to an auxiliary electrode of an oxide transistor will be described.

Figure 22:
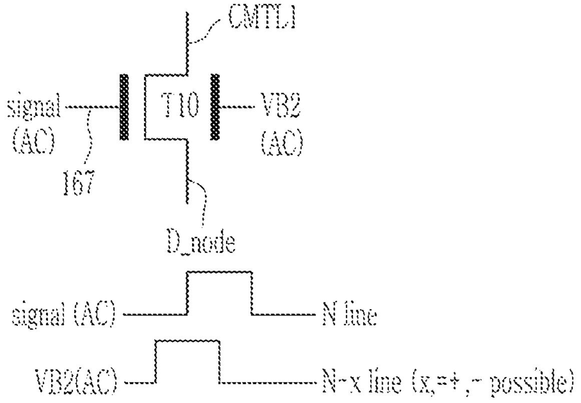
FIG. 22 illustrates a circuit structure of a tenth transistor including an oxide semiconductor included in a pixel according to some embodiments.

FIG. 22 illustrates a circuit structure of a tenth transistor including an oxide semiconductor included in a pixel according to some embodiments.

Referring to FIG. 22, not as in FIG. 17, it is shown that a signal applied to a first auxiliary electrode CMTL1 is applied with a voltage VB2 of which a voltage level changes like AC.

In FIG. 22, according to some embodiments, a signal applied to a 2-1 scan line 167 of a gate electrode of a tenth transistor T10 and a waveform of a voltage VB2 applied to a first auxiliary electrode CMTL1 are additionally illustrated.

In the embodiments shown in FIG. 22, the voltage VB2 applied to the first auxiliary electrode CMTL1 is related to the signal applied to the 2-1 scan line 167. Here, because the signal applied to the 2-1 scan line 167 is a 2-1 scan signal GC2, the voltage VB2 applied to first auxiliary electrode CMTL1 may be a signal applied to previous or subsequent pixels among the 2-1 scan signal GC2 applied to the 2-1 scan line 167. In FIG. 22, the voltage VB2 applied to the first auxiliary electrode CMTL1 is shown as the 2-1 scan signal GC2 applied to the previous pixel, and during a period when the tenth transistor T10 is turned on, a voltage of the low level of the 2-1 scan signal GC2 is applied. Referring to FIG. 19, when a low voltage is applied to the first auxiliary electrode CMTL1, a threshold voltage of the tenth transistor T10 increases, and the same effect as in Embodiment 2 of FIG. 20 is generated in the same way. That is, because a voltage difference between the gate electrode and the second electrode of the tenth transistor T10 is large, the electric field formed in the channel increases, and as a result, a relatively large amount of charge can be transmitted in a short time, and the amount of charges that charge the storage capacitor Cst in a short time is also increased. Therefore, even when the data voltage needs to be transmitted to the storage capacitor Cst in a short time, such as in high-speed driving, the charging amount can be adjusted so as not to be insufficient, thereby preventing or reducing deterioration of display quality.

Hereinafter, the entire connection structure of the first auxiliary electrode CMTL1 will be described with reference to FIG. 23.

Figure 23:
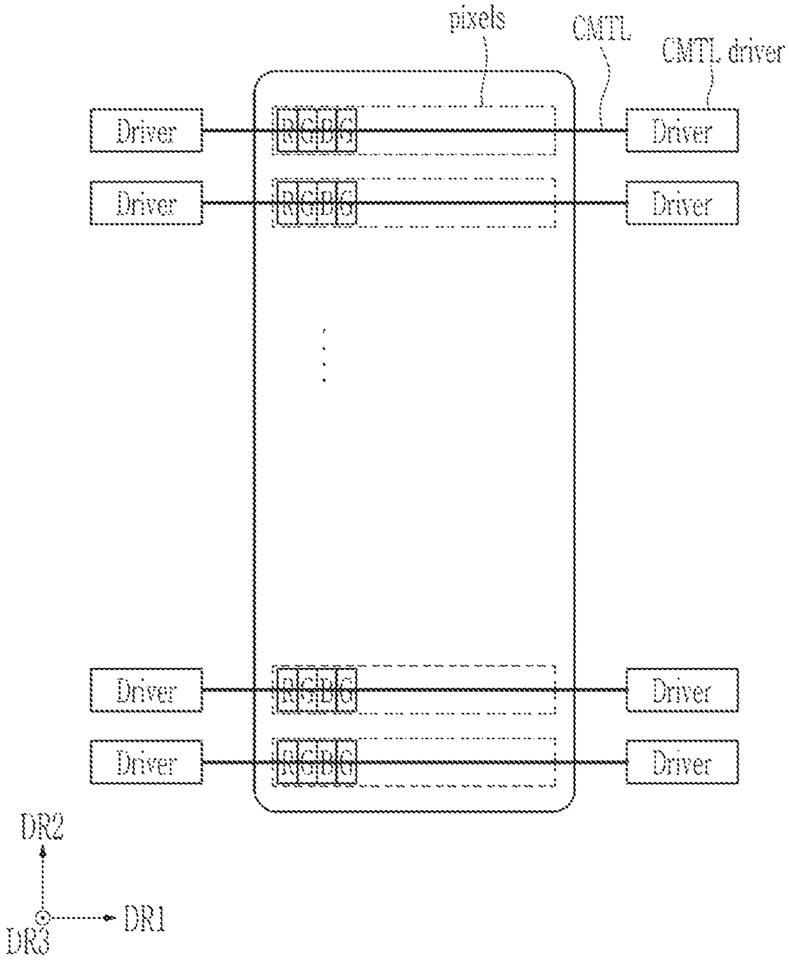
FIG. 23 shows the entire connection structure of an auxiliary electrode in a light emitting display device according to some embodiments.

FIG. 23 shows the entire connection structure of an auxiliary electrode in a light emitting display device according to some embodiments.

An auxiliary electrode line CMTL includes the first auxiliary electrode CMTL1 shown in FIG. 22, and is formed in a single wiring structure extending in a first direction DR1. As a result, the first auxiliary electrode CMTL1 overlapping with a tenth transistor T10 of each pixel can be integrally formed with the first auxiliary electrode CMTL1 of the adjacent pixel. In addition, the second auxiliary electrode CMTL2 overlapping with an eleventh transistor T11, which is another oxide semiconductor, is also connected to the first auxiliary electrode CMTL1 and a second auxiliary electrode CMTL2 of the adjacent pixel to form a single wiring structure.

Unlike the embodiments of FIG. 18, in the embodiments of FIG. 23, a plurality of auxiliary electrode lines CMTL are not connected, and one auxiliary electrode line CMTL may be connected to a driver CMTL Driver to receive different voltages VB2. Here, the driver CMTL Driver is a portion that generates different voltages VB2, and may correspond to different stages included in the driver that generates a 2-1 scan signal GC2. In this case, each stage of the driver generating the 2-1 scan signal GC2 may be connected to one 2-1 scan line 167 and one auxiliary electrode line CMTL.

According to some embodiments, the pixel circuit structure of FIG. 1 may be modified, and the example variation of the pixel circuit of FIG. 1 will be described in more detail with reference to FIG. 24 to FIG. 26.

Figure 24:
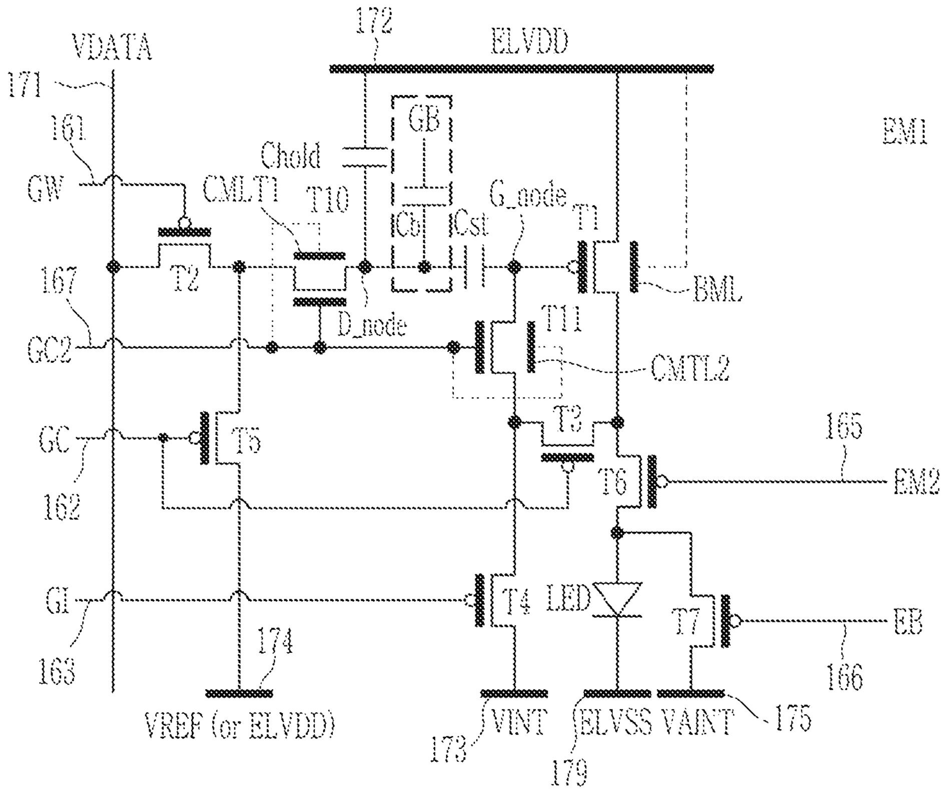
FIG. 24 to FIG. 26 are modified equivalent circuit diagram of one pixel included in a light emitting display device according to some embodiments.
Figure 25:
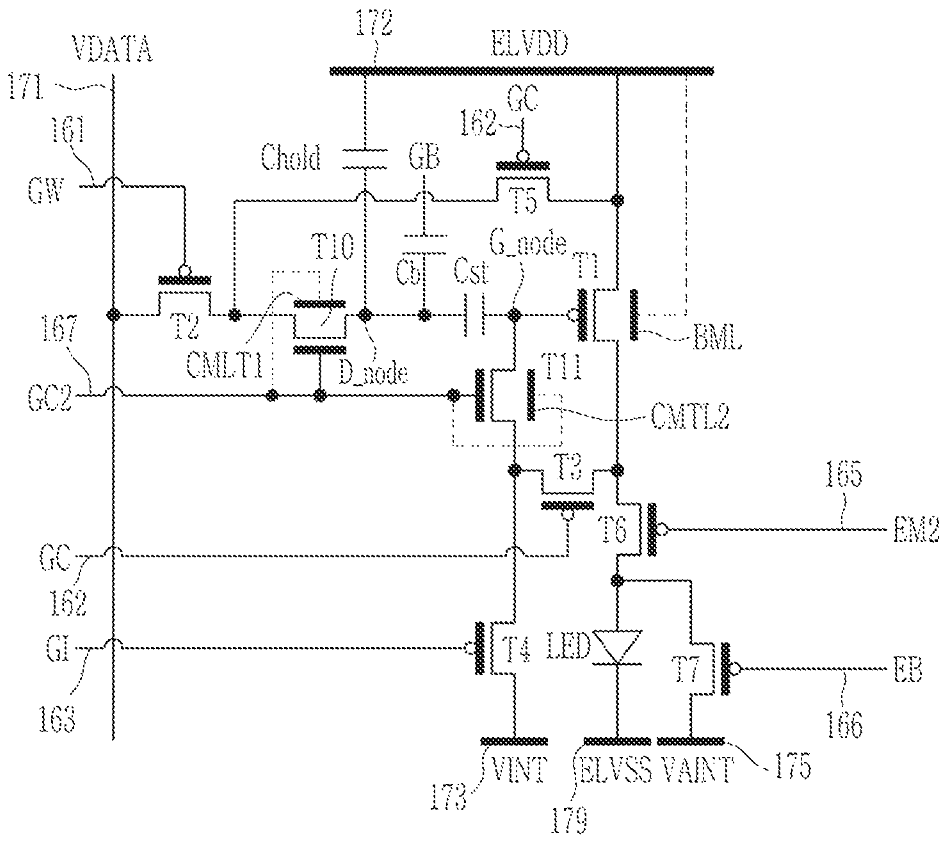
Figure 26:
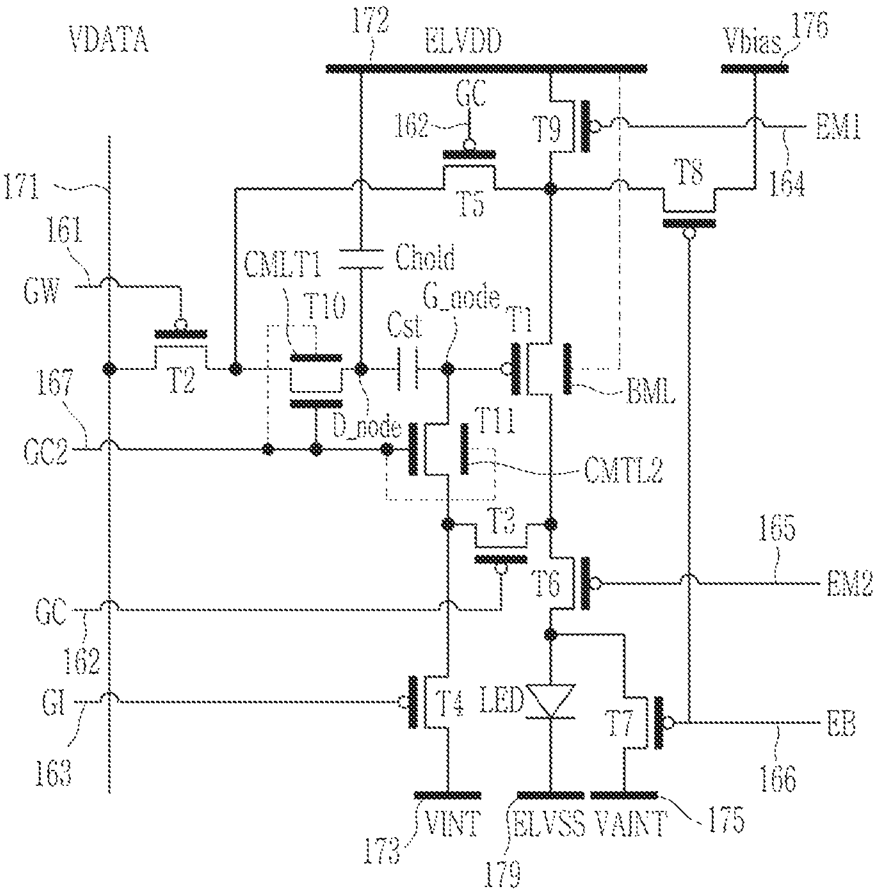

FIG. 24 to FIG. 26 are modified equivalent circuit diagram of one pixel included in a light emitting display device according to the embodiments of FIG. 1.

First, embodiments of FIG. 24 will be described.

In the embodiments of FIG. 24, unlike the embodiments of FIG. 1, and auxiliary capacitor Cb is further included.

The auxiliary capacitor Cb includes a first electrode through which an additional signal GB is transmitted, a second storage electrode of a storage capacitor Cst, a second electrode of a hold capacitor Chold, and a second electrode of a tenth transistor T10, that is, the second electrode connected to a data node D_node. The auxiliary capacitor Cb serves to maintain a voltage of the second storage electrode of the storage capacitor Cst to be constant along with the hold capacitor Chold, and additionally compensates a voltage of the second electrode of the storage capacitor Cst according to the additional signal GB applied to the first electrode. The additional signal GB may be one of various signals applied to the pixel, and according to some embodiments, it may be connected to a fourth scan line 166 connected to a gate electrode of the seventh transistor T7 to receive a fourth scan signal EB.

Meanwhile, according to the embodiments of FIG. 24, unlike the embodiments of FIG. 1, a ninth transistor T9 and an eighth transistor T8 are not included. However, according to some embodiments, as in the embodiments of FIG. 1, it may further include the ninth transistor T9 and the eighth transistor T8.

In the embodiments of FIG. 24, because it has a relatively large capacitance due to two capacitors (hold capacitor Chold and auxiliary capacitor Cb), it has a merit that the variability of the voltage of the second electrode of the storage capacitor Cst is further reduced.

Meanwhile, when the voltage level of the additional signal GB is changed, the auxiliary capacitor Cb may compensate the voltage of the second electrode of the storage capacitor Cst according to the change degree of the additional signal GB.

Meanwhile, according to some embodiments, a driving voltage ELVDD may be applied instead of a reference voltage VREF to a first electrode of the fifth transistor T5 of FIG. 24.

On the other hand, in some embodiments as illustrated in FIG. 25, as in the embodiments of FIG. 24, an auxiliary capacitor Cb is included but a position where the fifth transistor T5 is formed is different from the embodiments of FIG. 1 and FIG. 24.

In the embodiments of FIG. 25, the fifth transistor T5 is connected with a driving voltage line 172. The fifth transistor T5 includes a gate electrode connected to a second scan line 162 to which a second scan signal GC is applied, a first electrode receiving a driving voltage ELVDD, and a second electrode connected with a first electrode of a tenth transistor T10 and a second electrode of a second transistor T2. The fifth transistor T5 passes through the tenth transistor T10 and serves to initialize the second electrode of a storage capacitor Cst and a second electrode of a hold capacitor Chold by changing the driving voltage ELVDD, respectively.

Meanwhile, in the embodiments of FIG. 25, as in the embodiments of FIG. 24, a ninth transistor T9 and an eighth transistor T8 are not included. However, according to some embodiments, as in the embodiments of FIG. 1, the ninth transistor T9 and the eighth transistor T8 may further be included.

The embodiments of FIG. 25 is different from the embodiments of FIG. 1 and FIG. 24 in a difference that a voltage that initializes the second electrode of the storage capacitor Cst and the second electrode of the hold capacitor Chold is the driving voltage ELVDD, not the reference voltage VREF.

Meanwhile, the embodiments of FIG. 26 is different from the embodiments of FIG. 1 in a position of the fifth transistor T5.

Referring to FIG. 26, the fifth transistor T5 serves to initialize the driving voltage ELVDD by passing through the tenth transistor T10 and changing the second electrode of the storage capacitor Cst, and the second electrode of the hold capacitor Chold to the reference voltage VREF, respectively, and for example, may have a structure as follows.

The fifth transistor T5 includes a gate electrode connected to the second scan line 162 to which the second scan signal GC is applied, a first electrode receiving the driving voltage ELVDD through the ninth transistor T9, and a second electrode connected with the first electrode of the tenth transistor T10 and the second electrode of the second transistor T2. Although the fifth transistor T5 is not directly connected with the driving voltage line 172, based on FIG. 2, the ninth transistor T9 is in the turned-on state during the initialization and compensation period, and thus when the low voltage is applied to the second scan signal GC, the first electrode of the fifth transistor T5 receives the driving voltage ELVDD. Therefore, the driving voltage ELVDD passes through the fifth transistor T5 and the tenth transistor T10 and is transmitted to the second electrode of the storage capacitor Cst and the second electrode of the hold capacitor Chold.

An example variation of the embodiments of FIG. 1 is not limited to FIG. 24 to FIG. 26, and may be modified to various combinations thereof.

In the following, another pixel circuit structure having a pixel circuit structure different from the embodiments of FIG. 1 and its operation will be described with reference to FIG. 27 and FIG. 28.

Figure 27:
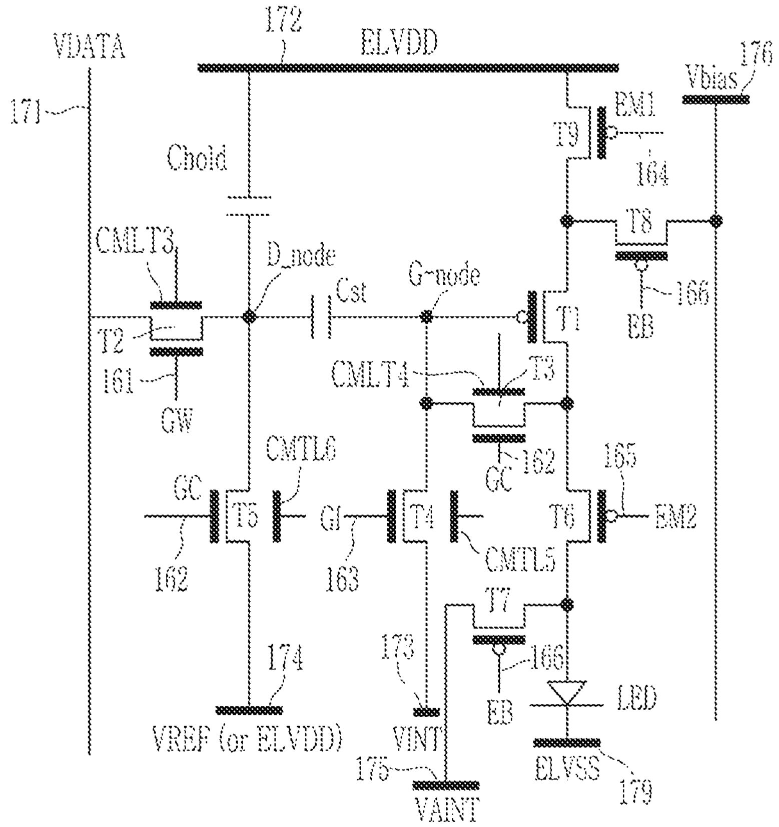
FIG. 27 is an equivalent circuit diagram of one pixel included in a light emitting display device according to some embodiments.

FIG. 27 is an equivalent circuit diagram of one pixel included in a light emitting display device according to some embodiments.

Embodiments of FIG. 27 does not include a tenth transistor and an eleventh transistor, and includes a second transistor T2, a third transistor T3, a fourth transistor T4, and a fifth transistor T5 as an oxide transistor, and the remaining transistors (driving transistor T1, sixth transistor T6, seventh transistor T7, eighth transistor T8, and ninth transistor T9) are formed of polycrystalline transistors.

A pixel circuit portion of a pixel according to the embodiments of FIG. 27 includes a driving transistor T1, a second transistor T2, a third transistor T3, fourth transistor T4, a fifth transistor T5, a sixth transistor T6, a seventh transistor T7, an eighth transistor T8, a ninth transistor T9, a storage capacitor Cst, and a hold capacitor Chold. In addition, the pixel circuit portion may be connected to a first scan line 161 to which a first scan signal GW is applied, a second scan line 162 to which a second scan signal GC is applied, a third scan line 163 to which a third scan signal GI is applied, light emitting signal lines 164 and 165 to which light emitting signals EM1 and EM2 are applied, a fourth scan line to which a fourth scan signal EB is applied, and a data line 171 to which a data voltage VDATA is applied. In addition, the pixel may be applied with a driving voltage ELVDD, a driving low voltage ELVSS, a first initialization voltage VINT, a second initialization voltage VAINT, a reference voltage VREF, and a bias voltage Vbias.

The structure of the pixel will be described, focusing on each element (transistor, capacitor, light emitting diode (LED)) included in the pixel.

The driving transistor T1 includes a driving gate electrode connected with a first electrode of the storage capacitor Cst, a first electrode (input side electrode) connected to the driving voltage ELVDD through the ninth transistor T9, and a second electrode (output side electrode) outputting a current according to a voltage of the driving gate electrode.

The gate electrode of driving transistor T1 is connected to a second electrode of the third transistor T3 and a first electrode of the storage capacitor Cst. The first electrode of the driving transistor T1 is connected with a second electrode of the ninth transistor T9 and a second electrode of the eighth transistor T8 and applied with the driving voltage ELVDD and/or the bias voltage Vbias, and the second electrode of the driving transistor T1 is connected with a first electrode of the third transistor T3 and a first electrode of the sixth transistor T6. An output current of the driving transistor T1 passes through the sixth transistor T6 and is transmitted to the light emitting diode LED such that the light emitting diode LED emits light. The luminance of the light emitted by the light emitting diode LED is determined according to the intensity of the output current of the driving transistor T1. Meanwhile, the driving transistor T1 may further include an overlapping electrode BML overlapping at least a part (e.g., a channel) of a semiconductor (e.g., a polycrystalline semiconductor) of the driving transistor as shown in FIG. 1.

The second transistor T2 is formed of an oxide transistor, includes a gate electrode connected to the first scan line 161 to which the first scan signal GW is applied, a first electrode connected to the data line 171 to which the data voltage VDATA is applied, and a second electrode connected with a second electrode the fifth transistor T5 and a second storage electrode of the storage capacitor Cst. The second transistor T2 inputs the data voltage VDATA into the pixel according to the first scan signal GW and thus it can be stored in the second storage electrode of the storage capacitor Cst.

The second transistor T2 may further include a third auxiliary electrode CMTL3 overlapping at least a part (for example, a channel) of the oxide semiconductor. A DC voltage or a voltage of which a voltage level is changed may be applied to the third auxiliary electrode CMTL3, and may be connected to the gate electrode of the second transistor T2 according to some embodiments. When the third auxiliary electrode CMTL3 is formed in the second transistor T2 and a relatively low voltage is applied to the third auxiliary electrode CMTL3, as shown in FIG. 19, a threshold voltage of the second transistor T2, which is an oxide transistor, is increased. As a result, as shown in FIG. 20, a voltage difference between the gate electrode and the second electrode of second transistor T2, which is an oxide transistor, increases by Δ. The large voltage difference between the gate electrode and the second electrode of the second transistor T2, which is an oxide transistor, causes the electric field formed in the channel to be increased, and thus a relatively large amount of charge may be transmitted in a short time and the amount of charge to charge the storage capacitor Cst in a short time is also increased. Therefore, even when the data voltage VDATA needs to be transmitted to the storage capacitor Cst in a short time, such as in high-speed driving, the charging amount can be adjusted so as not to be insufficient, thereby preventing or reducing deterioration of display quality.

The third transistor T3 is formed of an oxide transistor, and includes a gate electrode connected to the second scan line 162 to which the second scan signal GC is applied, a first electrode connected with the second electrode of the driving transistor T1 connected with the second scan line 162 and a first electrode of the sixth transistor T6, and a second electrode connected with the driving gate electrode of the driving transistor T1, a second electrode of fourth transistor T4, and a first storage electrode of storage capacitor Cst, that is, a gate node G_node. The third transistor T3 forms a compensation path that compensates for the threshold voltage of the driving transistor T1 such that the threshold voltage of the driving transistor T1 is stored in the first electrode of the storage capacitor Cst to be compensated. As a result, although the threshold voltage of the driving transistor T1 included in each pixel is different, the driving transistor T1 can output a constant output current according to the applied data voltage VDATA.

The third transistor T3 may further include a fourth auxiliary electrode CMTL4 overlapping at least a portion (e.g., a channel) of an oxide semiconductor. A DC voltage or a voltage of which a voltage level is changed may be applied to the fourth auxiliary electrode CMTL4, and may be connected to the gate electrode of the third transistor T3 according to some embodiments. As a result, as described with reference to FIG. 17 to FIG. 23, the characteristic of the third transistor T3 is improved, and may have a merit of compensating the threshold voltage of the driving transistor T1 in a short time.

The fourth transistor T4 is formed of an oxide transistor, and includes a gate electrode connected to the third scan line 163 to which the third scan signal GI is applied, a first electrode to receive the first initialization voltage VINT, and a second electrode connected to the gate node G_node. The fourth transistor T4 serves to initialize the gate node G_node to the first initialization voltage VINT by transmitting the first initialization voltage VINT into the pixel.

The fourth transistor T4 may further include a fifth auxiliary electrode CMTL5 overlapping at least a portion (e.g., a channel) of the oxide semiconductor. A DC voltage or a voltage of which a voltage level is changed may be applied to the fifth auxiliary electrode CMTL5, and may be connected to the gate electrode of the fourth transistor T4 according to some embodiments. As a result, as described with reference to FIG. 17 to FIG. 23, the characteristic of the fourth transistor T4 is improved, thereby enabling initialization in a short time.

The fifth transistor T5 is formed of an oxide transistor, and includes a gate electrode connected to the second scan line 162 to which the second scan signal GC is applied, a first electrode receiving the reference voltage VREF, and a second electrode connected with the second electrode of the second transistor T2, the second storage electrode of the storage capacitor Cst, the second electrode of the hold capacitor Chold, that is the data node D_node. The fifth transistor T5 serves to initialize the second storage electrode of the storage capacitor Cst and the second electrode of the hold capacitor Chold by changing them to the reference voltage VREF, respectively.

The fifth transistor T5 may further include a sixth auxiliary electrode CMTL6 overlapping at least a part (for example, a channel) of the oxide semiconductor. A DC voltage or a voltage of which a voltage level is changed may be applied to the sixth auxiliary electrode CMTL6, and may be connected to the gate electrode of the fifth transistor T5 according to some embodiments. As a result, as described with reference to FIG. 17 to FIG. 23, the characteristic of the fifth transistor T5 is improved, thereby enabling initialization in a short time.

In addition, according to some embodiments, the driving voltage ELVDD may be applied to the first electrode of the fifth transistor T5 of FIG. 27 instead of the reference voltage VREF.

The sixth transistor T6 includes a gate electrode connected with the second light emission signal line 165 of the second light emission signal EM2, a first electrode connected with the second electrode of the driving transistor T1 and the first electrode of the third transistor T3, and a second electrode connected with an anode of the light emitting diode LED and a second electrode of the seventh transistor T7. The sixth transistor T6 transmits or blocks the output current of the driving transistor T1 to the light emitting diode LED based on the second light emission signal EM2.

The seventh transistor T7 includes a gate electrode connected to the fourth scan line 166 to which the fourth scan signal EB is applied, a first electrode to which the second initialization voltage VAINT is applied, and a second electrode connected with the anode of the light emitting diode LED and the second connected to the second electrode of the sixth transistor T6. The seventh transistor T7 serves to initialize the anode of the light emitting diode LED with the second initialization voltage VAINT.

The eighth transistor T8 includes a gate electrode connected with the fourth scan line 166 to which the fourth scan signal EB is applied, a first electrode receiving the bias voltage Vbias, and a second electrode connected with the first electrode of the driving transistor T1 and a second electrode of the ninth transistor T9. The eighth transistor T8 transmits the bias voltage Vbias to the first electrode of the driving transistor T1 such that the characteristic of the driving transistor T1 can be maintained constant. For example, when the bias voltage Vbias is transmitted to the first electrode of the driving transistor T1, even if the driving transistor T1 does not receive a separate data voltage VDATA, the output current can be constantly generated with the previously received data voltage VDATA. This operation may serve to maintain the characteristics of the driving transistor T1 during high-speed driving or low-speed driving.

The ninth transistor T9 includes a gate electrode connected with the first light emission signal line 164 to which the first light emission signal EM1 is applied, a first electrode receiving the driving voltage ELVDD, and a second electrode connected with the first electrode of the driving transistor T1 and a second electrode of the eighth transistor T8. The ninth transistor T9 transmits the driving voltage ELVDD to the first electrode of the driving transistor T1 such that the driving transistor T1 may generate a current.

In the embodiments of FIG. 27, all transistors can be divided into p-type transistors formed using polycrystalline semiconductors and n-type transistors formed using oxide semiconductors. Referring to FIG. 27, the driving transistor T1, the sixth transistor T6, the seventh transistor T7, the eighth transistor T8, and the ninth transistor T9 are polycrystalline transistors including polycrystalline semiconductors, and the second transistor T2, the third transistor T3, the fourth transistor T4, and the fifth transistor T5 are oxide transistors containing semiconductors. In addition, in the embodiments of FIG. 27, a polycrystalline transistor is a p-type transistor that may be turned on by a low-level voltage and turned off by a high-level voltage. On the other hand, the oxide transistor is an n-type transistor and can be turned on by a high-level voltage and turned off by a low-level voltage. According to some embodiments, the seventh transistor T7 may be an oxide transistor including an oxide semiconductor, and may be turned on by a high-level voltage and turned off by a low-level voltage. In addition, according to some embodiments, a gate electrode of the seventh transistor T7 may be connected to a separate signal line instead of the fourth scan line 166, and for example, may be one of light emission signal lines 164 and 166 to which light emitting signals EM1 and EM2 are applied.

Meanwhile, in the embodiments of FIG. 27, the second transistor T2, the third transistor T3, the fourth transistor T4, and the fifth transistor T5 respectively include the third auxiliary electrode CMTL3, the fourth auxiliary electrode CMTL4, the fifth auxiliary electrode CMTL5, and the sixth auxiliary electrode CMTL6, but according to some embodiments, at least one transistor may not include an auxiliary electrode.

The storage capacitor Cst includes the first storage electrode connected to the gate node G_node and the second storage electrode connected to the data node D_node. The storage capacitor Cst receives the data voltage VDATA through the second transistor T2 or the reference voltage VREF through the fifth transistor T5, changes the voltage of the gate electrode of the driving transistor T1, and maintains the received voltage until the next voltage is transmitted. In the pixel according to some embodiments, the data voltage VDATA is not directly transmitted to the gate electrode of the driving transistor T1, but through the storage capacitor Cst. This is a method of indirectly transmitting the data voltage VDATA to the gate electrode of the driving transistor T1 by using the fact that when the voltage of the second electrode of the storage capacitor Cst suddenly rises, the voltage of the first electrode of the other electrode also rises. According to this method, although a leakage occurs in at least one transistor (e.g., second transistor T2, etc.) among the transistors included in the pixel, the voltage of the gate electrode of the driving transistor T1 does not directly leak such that the effect is insignificant. In addition, according to some embodiments, the data voltage VDATA passes through the storage capacitor Cst without passing through other electrodes of the driving transistor T1 and is directly transmitted to the gate electrode of the driving transistor T1, and thus even if there is a difference in the driving voltage ELVDD depending on the position of the pixel, the difference in the driving voltage ELVDD does not affect determining a voltage stored in the storage capacitor Cst.

The hold capacitor Chold includes the first electrode receiving the driving voltage ELVDD and the second electrode connected to the data node D_node, and serves to maintain the voltage of the second electrode of the storage capacitor Cst, that is, the voltage of the data node D_node to be constant. That is, according to the hold capacitor Chold, the voltage of the second electrode of the storage capacitor Cst, that is, the data node D_node, does not change and can have a constant voltage even when the surrounding signal changes.

The light emitting diode LED includes the anode connected to the second electrode of the sixth transistor T6 and a second electrode of the seventh transistor T7 and a cathode connected to the driving low voltage ELVSS. The light emitting diode LED may emit light with luminance corresponding to the current supplied from the pixel circuit portion (to be precise, the driving transistor T1) by positioning it between the pixel circuit portion and the driving low voltage ELVSS. The light emitting diode LED may include an emission layer including at least one of an organic light emitting material or an inorganic light emitting material. Holes and electrons are injected into the emission layer from the anode and cathode, respectively, and light emission occurs when the exciton combined with the injected holes and electrons falls from the excited state to the ground state. The light emitting diode LED may emit light of one of the primary colors or white light. Examples of primary colors include three primary colors of red, green, and blue. Other examples of primary colors include yellow, cyan, and magenta. According to some embodiments, additional color filters or color conversion layers may be further included to improve color display characteristics.

Hereinafter, operation of the pixel in the case of applying the waveform of FIG. 28 to the pixel of FIG. 27 will be described in detail.

Figure 28:
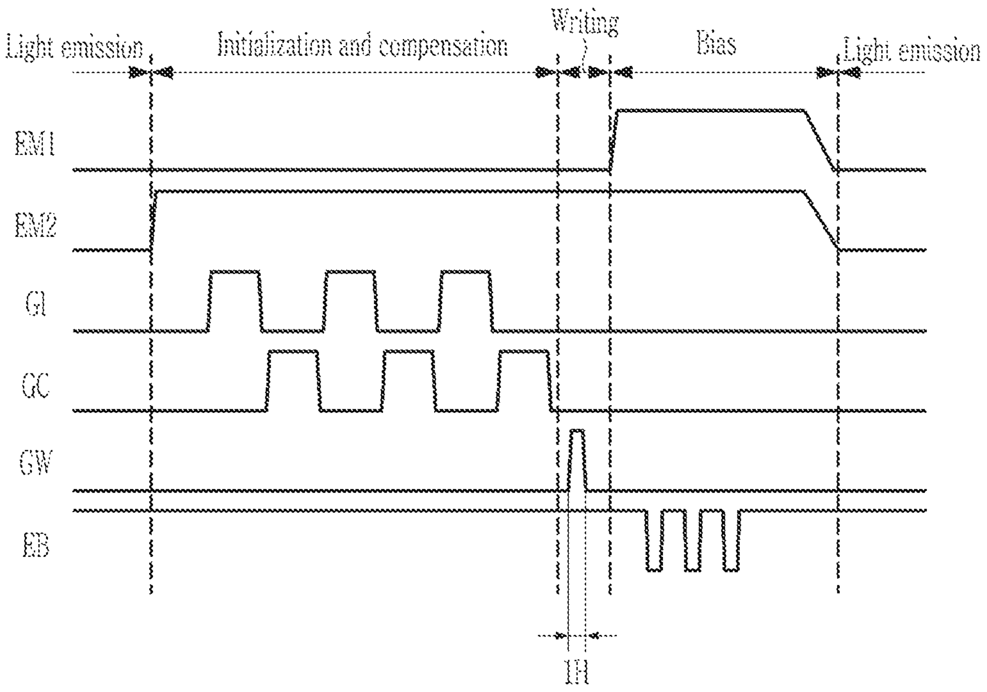
FIG. 28 is a waveform diagram of a signal applied to the pixel of FIG. 27 according to some embodiments.

FIG. 28 is a waveform diagram of a signal applied to the pixel of FIG. 27.

Referring to FIG. 28, a period during which the signal is applied can be divided into an initialization and compensation period, a writing period, a bias period, and a light emission period.

First, the light emission period is the period in which the light emitting diode LED emits light, and a gate-on voltage (low level voltage) is applied to the first and second light emitting signals EM1 and EM2 to turn on the sixth transistor T6 and the ninth transistor T9. When the driving voltage ELVDD is applied to the driving transistor T1 and thus an output current is generated according to the voltage of driving gate electrode (or first storage electrode), the output current of the driving transistor T1 passes through the turned-on sixth transistor T6 and is transmitted to the light emitting diode LED. Therefore, in the light emission period, the light emitting diode LED emits light according to the intensity of the received output current. In FIG. 2, the light emission period in which the light emission signal applies the gate-on voltage (low level voltage) is hardly shown, but substantially the light emission period may have the longest time.

When the light emission period ends, the initialization and compensation period is started Here, in the initialization and compensation period, some electrodes and nodes are initialized while other electrodes and nodes perform compensation operations.

The light emission period ends when the second light emission signal EM2 changes to the gate-off voltage (high level voltage). The sixth transistor T6, to which the second light emission signal EM2 is applied, is turned off, and the ninth transistor T9, to which the first light emission signal EM1 is applied, remains the turned-on state, and the driving voltage ELVDD is continuously applied to the first electrode of the driving transistor T1. A period during which the gate-off voltage of the second light emission signal EM2 is applied includes the initialization and compensation period, the write period, and the bias period.

After being changed to the gate-off voltage of the second light emission signal EM2, the third scan signal GI is changed to the gate-on voltage (high level voltage). As a result, the fourth transistor T4 receiving the third scan signal GI is turned on.

The first initialization voltage VINT is transmitted to the gate node G_node connected to the second electrode of the fourth transistor T4 by the turned-on fourth transistor T4. As a result, the driving gate electrode of the driving transistor T1 and the first storage electrode of the storage capacitor Cst are initialized to the first initialization voltage VINT. Here, the first initialization voltage VINT may have a low-level voltage value, and according to some embodiments, the first initialization voltage VINT may be a low-level voltage that can turn on the driving transistor T1.

Thereafter, while the third scan signal GI is changed to a gate-off voltage (low level voltage), the second scan signal GC is changed to a gate-on voltage (high level voltage). As a result, the fourth transistor T4 is turned off, and according to the second scan signal GC, the third transistor T3 and the fifth transistor T5 are turned on. In this case, the ninth transistor T9 maintains the turned-on state.

The reference voltage VREF is transmitted to the data node D_node, and the data node D_node, the second storage electrode, and the second electrode of the hold capacitor Chold are initialized to the reference voltage VREF by the turned-on fifth transistor T5.

In addition, an operation for compensating the threshold voltage of the driving transistor T1 is performed by the turned-on third transistor T3. The driving transistor T1 has a diode connection structure in which the driving gate electrode and the second electrode are connected by the turned-on third transistor T3. According to the first initialization voltage VINT, the driving transistor T1 has a turn-on state, and the driving voltage ELVDD transmitted to the first electrode of the driving transistor T1 passes through the second electrode of the driving transistor T1, and the third transistor T3, and is transmitted to the driving gate electrode of the driving transistor T1 and the first electrode of the storage capacitor Cst. Accordingly, the voltage of the driving gate electrode of the driving transistor T1 gradually rises from the first initialization voltage VINT, and then the driving transistor T1 is turned off when the voltage is lower than the driving voltage ELVDD by the threshold voltage of the driving transistor T1. The voltage of the driving gate electrode is stored in the first storage electrode of the storage capacitor Cst when the driving transistor T1 is turned off, and the voltage of the first storage e''ectr'de of the storage capacitor Cst may be the same as Equation 1 described above.

According to Equation 1, a threshold voltage Vth that may have different values for each driving transistor T1 can be compensated for.

After passing through the compensation period as described above, the second storage electrode of the storage capacitor Cst has a reference voltage VREF, and the first storage electrode has a voltage value of Equation 1.

The initialization and compensation period may be divided into a first period during which the gate-on voltage (high level voltage) is applied as the third scan signal GI and the gate-off voltage (low level voltage) is applied as the second scan signal GC, and a second period during which the gate-off voltage (low level voltage) is applied as the third scan signal GI and the gate-on voltage (high level voltage) is applied as the second scan signal GC. Referring to FIG. 28, the initialization and compensation period includes the first period and the second period alternately multiple times. In the embodiments of FIG. 28, each of the first section and the second section is performed three times. However, according to some embodiments, the initialization and compensation period may include one first period and one second period.

In the embodiments of FIG. 28, as the second scan signal GC and the third scan signal GI both are changed to the gate-off voltage (low level voltage), the initialization and compensation period ends and the writing period is started.

In the writing period, the gate-off voltage is applied as the second scan signal GC, the third scan signal GI, and the second light emission signal EM2, and the gate-on voltage (low level voltage) is applied to first light emission signal EM1, and as the first scan signal GW is changed to the gate-on voltage (high level voltage) for 1H, the data voltage VDATA enters the pixel.

In the writing period, the second transistor T2 receiving the first scan signal GW is turned on, and the data voltage VDATA is output to the second electrode of the second transistor T2 and transmitted to the second storage electrode of the storage capacitor Cst and the second electrode of the hold capacitor Chold.

In the write period, the second electrode of the storage capacitor Cst is changed from the reference voltage VREF, which is the voltage applied to the compensation period, to the data voltage VDATA. In this case, the voltage value of the first electrode of the storage capacitor Cst is changed in proportion to the voltage change amount of the second electrode of the storage capacitor Cst. That is, because the voltage change amount of the second electrode of the storage capacitor Cst is a voltage difference between the data voltage VDATA and the reference voltage VREF, a voltage of the first electrode of the storage capacitor Cst is additionally changed by a value that is proportional to a difference between the voltage of the data voltage VDATA and the reference voltage VREF from the voltage value of Equation 1. In this case, the voltage value of the first electrode of the storage capacitor Cst may be lowered. As the voltage value of the gate electrode of the driving transistor T1 is lowered, the degree to which the driving transistor T1 is turned on is determined and the intensity of the output current is determined.

In FIG. 28, the gate-on voltage (high level voltage) of the first scan signal GW is maintained for 1H. Referring to FIG. 28, it can be determined that the initialization and compensation period, the bias period, and the light emission period are longer than the writing period of 1H, and the threshold voltage of the driving transistor T1 can be sufficiently compensated by making the compensation period have a time of 3H or more according to some embodiments. In other words, when the initialization and compensation period in which the pixel compensates for the threshold voltage of the driving transistor T1 and the writing period in which the data voltage VDATA is written are separated and the compensation time is extended three times longer than the writing period (1H) to perform high-speed driving, a time of 3H or more may prevent or reduce the compensation time from being insufficient even through 1H is very short such that sufficient compensation can be achieved during high-speed driving.

After that, as the first light emission signal EM1 is changed to a gate-off voltage (high level voltage), the writing period is ended and the bias period is started.

In the bias section, the gate-on voltage (low level voltage) is applied as the fourth scan signal EB, and the anode of the light emitting diode LED is initialized to the second initialization voltage VAINT by the seventh transistor T7 receiving the fourth scan signal EB.

In addition, the bias voltage Vbias is applied to the first electrode of the driving transistor T1 by the eighth transistor T8 receiving the fourth scan signal EB.

The characteristic of the driving transistor T1 to which the bias voltage Vbias is applied can be maintained constantly, and particularly, even if a separate data voltage VDATA is not input to the pixel, the driving transistor T1 may generate a constant output current with the previously received data voltage VDATA. Such an operation serves to maintain the characteristics of the driving transistor T1 during high-speed driving or low-speed driving, and can also reduce power consumption.

Referring to FIG. 28, a period during which the fourth scan signal EB maintains the gate-on voltage (low level voltage) may be 1H, and the fourth scan signal EB may apply the gate-on voltage (low level voltage) multiple times. In FIG. 28, embodiments in which the fourth scan signal EB applies the gate-on voltage (low level voltage) three times are shown.

After that, as the first light emission signal EM1 and the second light emission signal EM2 are changed to the gate-on voltage (voltage at a low level), the light emission period is started. In this case, the driving transistor T1 receives the driving voltage ELVDD, generates an output current according to the voltage of the driving gate electrode (voltage of the first storage electrode), and outputs it to the anode of the light emitting diode LED. As a result, the light emitting diode LED receives the output current of the driving transistor T1 and emits light.

Meanwhile, hereinafter, an example variation of FIG. 27 will be described in more detail with reference to FIG. 29.

Figure 29:
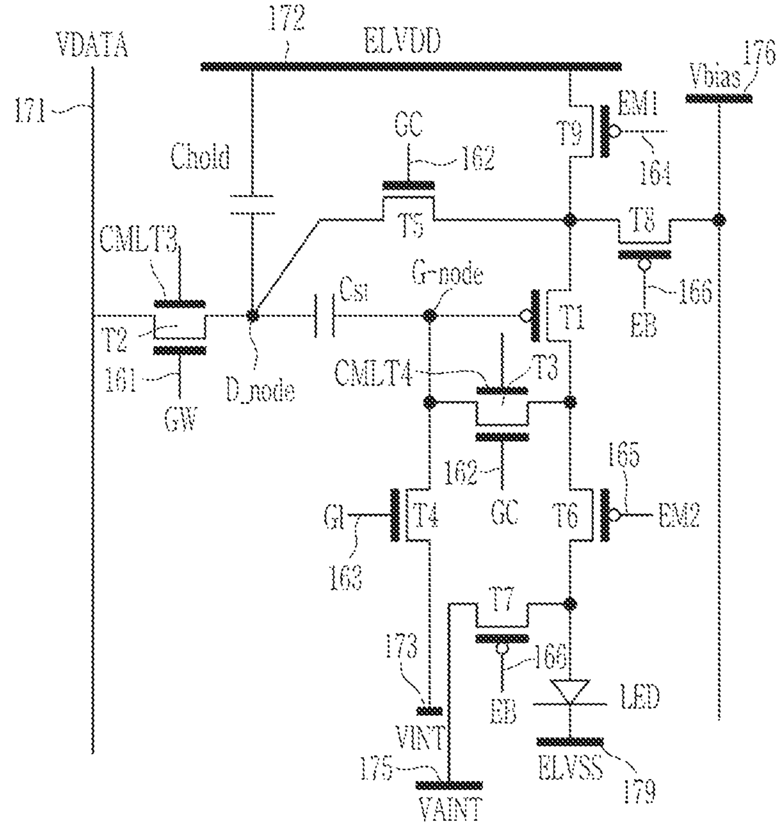
FIG. 29 is a modified equivalent circuit diagram of one pixel included in a light emitting display device according to some embodiments.

FIG. 29 is a modified equivalent circuit diagram of one pixel included in a light emitting display device according to the embodiments of FIG. 27.

Embodiments of FIG. 29 are different from the embodiments of FIG. 27 in that a connection portion of the fifth transistor T5 is different, and the second storage electrode of the storage capacitor Cst and the second electrode of the hold capacitor Chold are changed to the driving voltage ELVDD, respectively and then initialized.

That is, the fifth transistor T5 is formed of an oxide transistor, and includes a gate electrode connected with the second scan line 162 to which the second scan signal GC is applied, a first electrode receiving the driving voltage ELVDD through the ninth transistor T9, and a second electrode connected with the second electrode of the second transistor T2, the second electrode of the storage capacitor Cst, and the second electrode of the hold capacitor Chold, that is, the data node D_node. Although the fifth transistor T5 is not directly connected with the driving voltage line 172, based on FIG. 28, because the ninth transistor T9 maintains the turn-on state during the initialization and compensation period, the first electrode of the fifth transistor T5 receives the driving voltage ELVDD when the second scan signal GC is applied as a low voltage. Therefore, the driving voltage ELVDD passes through the fifth transistor T5 and is transmitted to the second storage electrode of the storage capacitor Cst and the second electrode of the hold capacitor Chold.

The example variation of the embodiments of FIG. 27 is not limited to FIG. 28, and various changes may be possible.

For example, the fifth transistor T5 may further include the sixth auxiliary electrode CMTL6 as shown in FIG. 27. For example, the sixth auxiliary electrode CMTL6 may overlap at least a part of an oxide semiconductor (for example, a channel), and may be applied with a DC voltage or voltage of which a level varies, and according to some embodiments, it may be connected with the gate electrode of the fifth transistor T5. As a result, as shown in FIG. 17 to FIG. 23, the characteristics of the fifth transistor T5 may be relatively improved, thereby enabling initialization in a short time.

Although aspects of some embodiments have been described in some detail above, the scope of embodiments according to the present invention is not limited thereto, and various modifications and improvements made by those skilled in the art using the basic concept of the present invention defined in the following claims, and their equivalents, are also included in the scope of the present invention.

Description of Some of the Reference Symbols

T1, T2, T3, T4, T5, T6, T7, T8, T9, T10, T11: transistor
LED: light emitting diode (LED)
Cst: storage capacitor
Chold: hold capacitor
D_node: data node
G_node: gate node
CMTL1, CMTL2, CMTL3, CMTL5: auxiliary electrode
CMTL: auxiliary electrode line
CMTL PAD: pad portion
CMTL-c: connection portion
CMTL Driver: driver
Cst2: second storage electrode
Cst2o: opening of second storage electrode
Chold1: first hold electrode
Ch1o1, Ch1o2: opening of first hold electrode
Cb: auxiliary capacitor
110: substrate
111: buffer layer
141, 142, 143: gate insulating layer
151, 152, 153: interlayer insulating layer
181, 182: organic layer
OP1, OP2, OP3, OP4: opening
BML, BML1, BML2: overlapping electrode
130, 1131, 1131-1, 1131-2, 1132, 1133, 1134, 1135, 1136, 1137, 1138, 1139: first semiconductor layer
1151, 1152, 1154, 1156, 1157, 1158, 1159: gate electrode
ChO10, ChO11: oxide semiconductor
161: first scan line
162, 162-1: second scan line
163: third scan line
164, 165: light emission signal line
166: fourth scan line
167: 2-1 scan line
171: data line
172, 172-1, 172-2: driving voltage line
173: first initialization voltage line
174, 174-1, 174-2: reference voltage line
175, 175-1, 175-2: second initialization voltage line

233112/411598

-continued

| Description of Some of the Reference Symbols | |
|---|---|
| 176: bias voltage line | RPL: repay line |
| LTPS TFT: polycrystalline transistor | Oxide TFT: oxide transistor |
| CE1, 171c, 172c, 173c, 175c, SD4, SD7, SD8, SD10a, SD10b, SD11a, SD11b, SD1ano: connection electrode | |
| SD2ano: anode connection electrode | 1661, 172-11: protruding portion |
| 380: pixel defining layer | OP: opening of pixel defining layer |
| 400: encapsulation layer | EML: emission layer |
| FL: function layer | |

What is claimed is:

1. A light emitting display device comprising:

a light emitting diode;

a driving transistor configured to transmit an output current to the light emitting diode, and including a driving gate electrode;

a storage capacitor having a first storage electrode connected with the driving gate electrode and a second storage electrode connected with a data node;

a second transistor connected with a data line and configured to output a data voltage;

a data voltage transmission transistor configured to transmit the data voltage output from the second transistor to the data node;

a hold capacitor that includes a first electrode configured to receive a driving voltage and a second electrode connected with the data node;

a first compensation transistor including a first electrode connected with the second electrode of the driving transistor; and a second compensation transistor that includes a second electrode connected with the driving gate electrode and the first storage electrode, wherein the first electrode of the driving transistor is configured to receive the driving voltage, the second electrode of the first compensation transistor and the first electrode of the second compensation transistor are connected with each other, and a gate electrode of the first compensation transistor and a gate electrode of the second compensation transistor are electrically connected to different scan lines, and the gate electrode of the second compensation transistor is electrically connected to a gate electrode of the data voltage transmission transistor.

2. The light emitting display device of claim 1, wherein the second transistor, the data voltage transmission transistor, and the storage capacitor form a data voltage transmission path for transmission of the data voltage to the driving gate electrode of the driving transistor, and the second transistor and the data voltage transmission transistor are different types of transistors.

3. The light emitting display device of claim 2, wherein the driving transistor and the second transistor are polycrystalline transistors and are configured to be turned on by a low-level voltage and to be turned off by a high-level voltage, and the data voltage transmission transistor is an oxide transistor and is configured to be turned on by a high-level voltage and to be turned off by a low-level voltage.

4. The light emitting display device of claim 1, wherein:

the data voltage transmission transistor comprises a gate electrode, an oxide semiconductor, and a first auxiliary electrode that overlaps the oxide semiconductor, and the first auxiliary electrode is connected to the gate electrode of a second compensation transistor, applied with a voltage of a constant level, or applied with a voltage of which a voltage level is changed.

5. The light emitting display device of claim 4, wherein the gate electrode of the data voltage transmission transistor is connected with a scan line for an oxide transistor of a present stage, and the first auxiliary electrode is electrically connected with a scan line for the oxide transistor at a different stage from that of the scan line for the oxide transistor at the present stage or the next stage.

6. The light emitting display device of claim 1, wherein the first compensation transistor is a polycrystalline transistor, and is configured to be turned on by a low-level voltage and to be turned off by a high-level voltage, and the second compensation transistor is an oxide transistor, and is configured to be turned on by a high-level voltage and to be turned off by a low-level voltage.

7. The light emitting display device of claim 6, wherein the second compensation transistor comprises a gate electrode, an oxide semiconductor, and a second auxiliary electrode overlapping the oxide semiconductor, and the second auxiliary electrode is connected with the gate electrode of the second compensation transistor, applied with a constant level voltage, or applied with a voltage of which a voltage level is changed.

8. The light emitting display device of claim 6, further comprising:

a first initialization transistor including a gate electrode, a first electrode receiving a first initialization voltage, and a second electrode connected with the second electrode of the first compensation transistor and the first electrode of the second compensation transistor; and an anode initialization transistor including a gate electrode, a first electrode receiving a second initialization voltage, and a second electrode connected with an anode of the light emitting diode.

9. The light emitting display device of claim 1, further comprising a data node initialization transistor configured to transmit a reference voltage or a driving voltage to the second electrode of the second transistor and the first electrode of the data voltage transmission transistor, wherein the second electrode of the second transistor and the first electrode of the data voltage transmission transistor are connected with each other, and the reference voltage or the driving voltage transmitted from the data node initialization transistor is configured to be transmitted to the data node through the data voltage transmission transistor.

10. The light emitting display device of claim 1, further comprising:

a driving voltage transmission transistor including a gate electrode, a first electrode configured to receive the driving voltage, and a second electrode connected with the first electrode of the driving transistor; and a current transmission transistor including a gate electrode, a first electrode connected with the second electrode of the driving transistor, and a second electrode connected with an anode of the light emitting diode.

11. The light emitting display device of claim 10, further comprising a bias transistor that includes a gate electrode, a first electrode receiving a bias voltage, and a second electrode connected with the first electrode of the driving transistor.

* * * * *